United States Patent
Chen et al.

(10) Patent No.: US 10,957,337 B2
(45) Date of Patent: Mar. 23, 2021

(54) MULTI-MICROPHONE SPEECH SEPARATION

(71) Applicant: Microsoft Technology Licensing, LLC, Redmond, WA (US)

(72) Inventors: Zhuo Chen, Kirkland, WA (US); Hakan Erdogan, Sammamish, WA (US); Takuya Yoshioka, Redmond, WA (US); Fileno A. Alleva, Redmond, WA (US); Xiong Xiao, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 159 days.

(21) Appl. No.: 15/991,988

(22) Filed: May 29, 2018

(65) Prior Publication Data

US 2019/0318757 A1 Oct. 17, 2019

Related U.S. Application Data

(60) Provisional application No. 62/656,280, filed on Apr. 11, 2018.

(51) Int. Cl.
*G10L 21/00* (2013.01)
*G10L 21/0272* (2013.01)
(Continued)

(52) U.S. Cl.
CPC .......... *G10L 21/0272* (2013.01); *G06N 3/08* (2013.01); *G10L 17/04* (2013.01); *G10L 17/18* (2013.01);
(Continued)

(58) Field of Classification Search
CPC ....... G10L 15/20; G10L 15/06; G10L 15/063; G10L 25/30; G10L 25/27; G10L 21/00; G10L 21/028; G10L 21/0272
See application file for complete search history.

(56) References Cited

U.S. PATENT DOCUMENTS 5,150,323 A 9/1992 Castelaz
7,383,178 B2 6/2008 Visser et al.
(Continued)

FOREIGN PATENT DOCUMENTS

| CN | 102169690 A | 8/2011 |
| EP | 1092964 B1 | 12/2007 |
| WO | 2017218492 A1 | 12/2017 |

OTHER PUBLICATIONS

Heymann, J., Drude, L., & Haeb-Umbach, R. (Mar. 2016). Neural network based spectral mask estimation for acoustic beamforming. In 2016 IEEE International Conference on Acoustics, Speech and Signal Processing (ICASSP) (pp. 196-200). IEEE. (Year: 2016).*
(Continued)

*Primary Examiner* — Edgar X Guerra-Erazo
(74) *Attorney, Agent, or Firm* — Rainier Patents, P.S.

(57) ABSTRACT

This document relates to separation of audio signals into speaker-specific signals. One example obtains features reflecting mixed speech signals captured by multiple microphones. The features can be input a neural network and masks can be obtained from the neural network. The masks can be applied one or more of the mixed speech signals captured by one or more of the microphones to obtain two or more separate speaker-specific speech signals, which can then be output.

21 Claims, 9 Drawing Sheets

(51) Int. Cl.
G06N 3/08 (2006.01)
G10L 17/04 (2013.01)
G10L 17/18 (2013.01)
G10L 19/022 (2013.01)
G10L 21/0208 (2013.01)
H04R 3/00 (2006.01)

(52) U.S. Cl.
CPC ........ *G10L 19/022* (2013.01); *G10L 21/0208* (2013.01); *H04R 3/005* (2013.01); *G10L 2021/02087* (2013.01)

(56) References Cited

U.S. PATENT DOCUMENTS

| | | | |
|---|---|---|---|
| 7,464,029 | B2 | 12/2008 | Visser et al. |
| 8,175,291 | B2 | 5/2012 | Chan et al. |
| 8,223,988 | B2 | 7/2012 | Wang et al. |
| 8,898,056 | B2 | 11/2014 | Chan et al. |
| 9,368,110 | B1 | 6/2016 | Hershey et al. |
| 9,685,155 | B2 | 6/2017 | Hershey et al. |
| 10,090,001 | B2 | 10/2018 | Theverapperuma et al. |
| 2003/0055610 | A1 | 3/2003 | Webber |
| 2006/0056647 | A1* | 3/2006 | Ramakrishnan .... G10L 21/0272 381/119 |
| 2007/0083365 | A1 | 4/2007 | Shmunk |
| 2008/0052074 | A1 | 2/2008 | Gopinath et al. |
| 2009/0086998 | A1 | 4/2009 | Jeong et al. |
| 2009/0089053 | A1 | 4/2009 | Wang et al. |
| 2009/0192796 | A1 | 7/2009 | Buck et al. |
| 2009/0220065 | A1 | 9/2009 | Ahuja et al. |
| 2009/0222262 | A1 | 9/2009 | Kim et al. |
| 2009/0279715 | A1 | 11/2009 | Jeong et al. |
| 2010/0004934 | A1 | 1/2010 | Hirose et al. |
| 2010/0111192 | A1 | 5/2010 | Graves |
| 2010/0174389 | A1 | 7/2010 | Blouet et al. |
| 2011/0257967 | A1 | 10/2011 | Every et al. |
| 2012/0120218 | A1 | 5/2012 | Flaks et al. |
| 2014/0163982 | A1 | 6/2014 | Daborn et al. |
| 2015/0073783 | A1 | 3/2015 | Gao |
| 2015/0095026 | A1 | 4/2015 | Bisani et al. |
| 2015/0269933 | A1* | 9/2015 | Yu ............................ G10L 25/21 704/232 |
| 2016/0111107 | A1 | 4/2016 | Erdogan et al. |
| 2017/0061978 | A1* | 3/2017 | Wang .................. G10L 21/0232 |
| 2017/0092265 | A1 | 3/2017 | Sainath et al. |
| 2017/0162194 | A1* | 6/2017 | Nesta ...................... G10L 25/30 |
| 2017/0278513 | A1 | 9/2017 | Li et al. |
| 2017/0295439 | A1 | 10/2017 | Xu et al. |
| 2017/0337924 | A1 | 11/2017 | Yu |
| 2018/0033449 | A1 | 2/2018 | Theverapperuma et al. |
| 2018/0254040 | A1 | 9/2018 | Droppo et al. |
| 2018/0261225 | A1 | 9/2018 | Watanabe et al. |
| 2018/0277137 | A1 | 9/2018 | Elko et al. |
| 2019/0043491 | A1 | 2/2019 | Kupryjanow et al. |
| 2019/0198024 | A1 | 6/2019 | Yu |
| 2020/0128322 | A1* | 4/2020 | Sabin ...................... G06F 3/165 |

OTHER PUBLICATIONS

Qian et al. "Single-Channel Multi-talker Speech Recognition with Permutation Invariant Training." arxiv, vol. abs/1707.06527, 2017), (Year: 2017).*
"Advisory Action Issued in U.S. Appl. No. 15/226,527", dated Feb. 22, 2018, 4 Pages.
"Final Office Action Issued in U.S. Appl. No. 15/226,527", dated Nov. 30, 2017, 28 Pages.
"Non Final Office Action Issued in U.S. Appl. No. 15/226,527", dated Jun. 22, 2017, 30 Pages.
"Non-Final Office Action Issued in U.S. Appl. No. 15/226,527", dated May 17, 2018, 29 Pages.
Abrash, et al., "Connectionist Speaker Normalization and Adaptation", In Proceedings of Fourth European Conference on Speech Communication and Technology, Sep. 1995, 4 Pages.

Barker, et al., "Speech Fragment Decoding Techniques for Simultaneous Speaker Identification and Speech Recognition", In Journal Computer Speech and Language, vol. 24, Issue 1, Jan. 1, 2010, 18 Pages.
Bourlard, et al., "Speech Pattern Discrimination and Multilayer Perceptrons", In Journal of Computer Speech and Language, vol. 3, Issue 1, Jan. 1989, 3 Pages.
Cooke, et al., "An Audio-Visual Corpus for Speech Perception and Automatic Speech Recognition (L)", In Journal of Acoustical Society of America, vol. 120, Issue 5, Nov. 2006, 4 Pages.
Weiss, et al., "Monaural Speech Separation and Recognition Challenge", In Journal Computer Speech and Language, vol. 24, Issue 1, Jan. 2010, 15 Pages.
Dahl, et al., "Context-Dependent Pre-Trained Deep Neural Networks for Large-Vocabulary Speech Recognition", In IEEE Transactions on Audio, Speech and Language Processing, vol. 20, Issue 1, Jan. 1, 2012, 13 Pages.
Every, et al., "Enhancement of Harmonic Content of Speech Based on a Dynamic Programming Pitch Tracking Algorithm", In Proceedings of 9th International Conference on Spoken Language Processing, Sep. 17, 2006, 5 Pages.
Gales, "Maximum likelihood linear transformations for hmm-based speech recognition", In Journal of Computer Speech & Language, vol. 12, Issue 2, Apr. 1998, 20 Pages.
Geiger, "Memory-Enhanced Neural Networks and NMF for Robust ASR", In Journal of IEEE/ACM Transactions on Audio, Speech and Language Processing, vol. 22, Issue 6, Jun. 1, 2014, pp. 1037-1046.
Ghahramani, et al., "Factorial Hidden Markov Models", In Proceedings of Machine Learning, vol. 29, Issue 2-3, Nov. 1, 1997, pp. 245-273.
Graves, et al., "Hybrid Speech Recognition with Deep Bidirectional LSTM", In Proceedings of IEEE Workshop on Automatic Speech Recognition and Understanding, Dec. 2013, pp. 273-278.
Hermansky, et al., "Tandem Connectionist Feature Extraction for Conventional Hmm Systems", In Proceedings of IEEE International Conference on Acoustics, Speech, and Signal Processing, vol. 3, Jun. 5, 2000, 4 Pages.
Hershey, et al., "Deep Clustering: Discriminative Embeddings for Segmentation and Separation", In Proceedings of IEEE International Conference on Acoustics, Speech and Signal Processing, Mar. 20, 2016, 5 Pages.
Hinton, et al., "Deep Neural Networks for Acoustic Modeling in Speech Recognition: The Shared Views of Four Research Groups", In Proceedings of the IEEE Signal Processing Magazine, vol. 29, Issue 6, Nov. 1, 2012, 27 Pages.
Hunt, et al., "A Comparison of Several Acoustic Representations for Speech Recognition with Degraded and Undegraded Speech", In Proceedings of IEEE International Conference on Acoustics, Speech, and Signal Processing, May 23, 1989.
Kristjansson, et al., "Super-Human Multi-Talker Speech Recognition: The IBM 2006 Speech Separation Challenge System", In Proceedings of 9th International Conference on Spoken Language Processing, vol. 12, Sep. 17, 2006, 4 Pages.
Li et al., "Improving Wideband Speech Recognition Using Mixed-Bandwidth Training Data in Cd-Dnn-Hmm", In the Proceedings of IEEE Spoken Language Technology Workshop, Dec. 2, 2012, pp. 131-136.
Lippmann, et al., "Multi-Style Training for Robust Isolated-Word Speech Recognition", In IEEE International Conference on Acoustics, Speech, and Signal Processing, Apr. 6, 1987, 4 Pages.
Maas, et al., "Recurrent Neural Networks for Noise Reduction in Robust ASR", In Proceedings of 13th Annual Conference of the International Speech Communication Association, Sep. 9, 2012, 4 Pages.
Ming, et al., "Combining Missing-feature Theory, Speech Enhancement and Speaker-Dependent/-Independent Modeling for Speech Separation", In Proceedings of the Ninth International Conference on Spoken Language Processing, Sep. 17, 2006, 25 Pages.
Mohamed, et al., "Acoustic Modeling using Deep Belief Networks", In Proceedings of the IEEE Transactions on Audio, Speech and Language Processing, vol. 20, Issue 1, Jan. 1, 2012, 10 Pages.

(56) References Cited

OTHER PUBLICATIONS

Mohri, et al., "Weighted Finite-State Transducers in Speech Recognition", In Proceedings of the Computer Speech & Language, vol. 16, Issue 1, Jan. 2002, 27 Pages.

Nam, et al., "Blind Speech Separation Combining DOA Estimation and Assignment Problem Approaches", In the Proceedings of the Second Symposium on Information and Communication Technology, Oct. 13, 2011, pp. 159-164.

Narayanan, Arun, et al., "Investigation of Speech Separation as a Front-End for Noise Robust Speech Recognition", In the Proceedings of IEEE/ACM Transactions on Audio, Speech and Language Processing, vol. 22, Issue 4, Apr. 2014, pp. 826-835.

"International Search Report and Written Opinion Issued in PCT Application No. PCT/US2017/031473", dated Jul. 21, 2017, 14 Pages.

Huang, et al., "Joint Optimization of Masks and Deep Recurrent Neural Networks for Monaural Source Separation", In Journal of IEEE/ACM Transactions on Audio, Speech, and Language Processing, vol. 23, Issue 12, Dec. 2015, pp. 2136-2147.

Rennie, et al., "Single-Channel Multitalker Speech Recognition", In Proceedings of Signal Processing Magazine, vol. 27, Issue 6, Oct. 18, 2010, pp. 66-80.

Sainath, et al., "Auto-Encoder Bottleneck Features using Deep Belief Networks", In Proceeding of International Conference on Acoustics, Speech and Signal Processing, Mar. 25, 2012, pp. 4153-4156.

Schmidt, et al., "Single-channel Speech Separation using Sparse Non-negative Matrix Factorization", In Proceedings of 9th International Conference on Spoken Language Processing, Sep. 17, 2006, 4 Pages.

Seide, et al., "Feature Engineering in Context-dependent Deep Neural Networks for Conversational Speech Transcription", In the Proceedings of IEEE Workshop on Automatic Speech Recognition and Understanding, Dec. 11, 2011, pp. 24-29.

Seltzer, et al., "An Investigation of Deep Neural Networks for Noise Robust Speech Recognition", In Proceedings of be IEEE International Conference on Acoustics, Speech and Signal Processing, May 26, 2013, pp. 7398-7402.

Shao, et al., "A Computational Auditory Scene Analysis System for Speech Segregation and Robust Speech Recognition", In Journal of Computer Speech and Language, vol. 24, Issue 1, Jan. 1, 2010, pp. 77-93.

Talkin, David., "A Robust Algorithm for Pitch Tracking (RAPT)", In Publication of Elsevier Science BV—Speech Coding and Synthesis, Nov. 1995, pp. 495-518.

Vincent, et al., "The second 'CHiME' Speech Separation and Recognition Challenge: Datasets, tasks and baselines", In the Proceedings of IEEE International Conference on Acoustics, Speech and Signal Processing, May 2013, 6 Pages.

Vinyals, et al., "Revisiting Recurrent Neural Networks for Robust ASR", In Proceedings of IEEE International Conference on Acoustics, Speech and Signal Processing, Mar. 25, 2012, pp. 4085-4088.

Virtanen, Tuomas, "Speech Recognition using Factorial Hidden Markov Models for Separation in the Feature Space", In Proceedings of 9th International Conference on Spoken Language Processing, Sep. 17, 2006, 4 Pages.

Wang, et al., "On Training Targets for Supervised Speech Separation", In Journal of IEEE/ACM Transactions on Audio, Speech, and Language Processing, vol. 22, Issue 12, Dec. 2014, pp. 1849-1858.

Weiss et al., "Monaural Speech Separation using Source-Adapted Models", In IEEE Workshop on Applications of Signal Processing to Audio and Acoustics, 2007, Oct. 21, 2007, pp. 114-117.

Weng, et al., "Deep Neural Networks for Single-channel Multitalker Speech Recognition", In Journal of IEEE/ACM Transactions on Audio, Speech, and Language Processing, vol. 23, Issue10, Oct. 1, 2015, pp. 1670-1679.

Weng, et al., "Recurrent Deep Neural Networks for Robust Speech Recognition", In the Proceedings of IEEE International Conference on Acoustic, Speech and Signal Processing, May 4, 2014, pp. 5569-5573.

Weng, et al., "Single-Channel Mixed Speech Recognition Using Deep Neural Networks", In Proceedings of the IEEE International Conference on Acoustics, Speech and Signal Processing, May 4, 2014, 5 Pages.

Weninger, et al., "The Munich 2011 CHiME Challenge Contribution: NMF-BLSTM Speech Enhancement and Recognition for Reverberated Multisource Environments", In Proceedings of Workshop on Machine Listening in Multisource Environments, Sep. 1, 2011, pp. 24-29.

Yu, et al., "Feature Learning in Deep Neural Networks—Studies on Speech Recognition Tasks", In Proceedings of Computing Research Repository, Jan. 2013, 9 Pages.

Yu, et al., "Improved Bottleneck Features using Pretrained Deep Neural Networks", In Proceedings of the 12th Annual Conference of the International Speech Communication Association, Aug. 28, 2011, pp. 237-240.

Yu, et al., "Permutation Invariant Training of Deep Models for Speaker-independent Multi-talker Speech Separation", In Proceedings of IEEE International Conference on Acoustics, Speech and Signal Processing, Mar. 5, 2017, pp. 241-245.

Allen, et al., "Image Method for Efficiently Simulating Small-Room Acoustics", In Journal of the Acoustical Society of America, vol. 65, Apr. 1979, pp. 943-950.

Amodei, et al., "Deep speech 2: End-to-end speech recognition in English and Mandarin", Retrieved from http://arxiv.org/abs/1512.02595, Jun. 11, 2016, pp. 1-28.

Anguera, et al., "Acoustic Beamforming for Speaker Diarization of Meetings", In Journal of IEEE Transactions on Audio, Speech, and Language Processing, vol. 15, Issue 7, Sep. 1, 2007, pp. 2011-2022.

Araki, et al., "DOA Estimation for Multiple Sparse Sources with Normalized Observation Vector Clustering", In Proceedings of the IEEE International Conference on Acoustics Speech and Signal Processing, vol. 5, May 14, 2006, 4 Page.

Boeddeker, et al., "Exploring Practical Aspects of Neural Mask-based Beamforming for Far-field Speech Recognition", In Proceedings of the IEEE International Conference on Acoustics, Speech and Signal Processing, Apr. 17, 2018, 5 Pages.

Cetin, et al., "Analysis of Overlaps in Meetings by Dialog Factors, Hot Spots, Speakers, and Collection Site: Insights for Automatic Speech Recognition", In Proceedings of the Ninth International Conference on Spoken Language Processing, Sep. 17, 2016, pp. 293-296.

Chen, et al., "Deep Attractor Network for Single-microphone Speaker Separation", In Proceedings of the IEEE International Conference on Acoustics, Speech and Signal Processing, Mar. 5, 2017, pp. 246-250.

Chen, et al., "Progressive Joint Modeling in Unsupervised Single-channel Overlapped Speech Recognition", In Journal of IEEE/ACM Transactions on Audio, Speech and Language Processing, Jul. 2017, pp. 184-196.

Chiu, et al., "Speech Recognition for Medical Conversations", Retrieved from https://arxiv.org/abs/1711.07274, Nov. 2017, 5 Pages.

Drude, et al., "Source Counting in Speech Mixtures using a Variational EM Approach for Complex Watson Mixture Models", In Proceedings of the IEEE International Conference on Acoustics, Speech and Signal Processing, May 4, 2014, pp. 6834-6838.

Drude, et al., "Tight Integration of Spatial and Spectral Features for BSS with Deep Clustering Embeddings", In Proceedings of 18th Annual Conference of the International Speech Communication Association, Aug. 20, 2017, pp. 2650-2654.

Edwards et al., "Medical Speech Recognition: Reaching Parity with Humans", In Proceedings of the 19th International Conference on Speech and Computer, Sep. 12, 2017, 10 Pages.

Erdogan, et al., "Improved MVDR beamforming using single-channel mask prediction networks", In Proceedings of the Interspeech, Sep. 8, 2016, pp. 1981-1985.

Fiscus, et al., "Multiple Dimension Levenshtein Edit distance Calculations for Evaluating Automatic Speech Recognition Systems during Simulaneous Speech", In Proceedings of the International Conference on language Resources and Evaluation, May 2006, pp. 803-808.

(56) References Cited

OTHER PUBLICATIONS

Fiscus, et al., "The Rich Transcription 2005 Spring Meeting Recognition Evaluation", In Proceedings of the Second International Workshop on Machine Learning for Multimodal Interaction, Jul. 11, 2005, 21 Pages.

Hain, et al., "Transcribing meetings with the AMIDA systems", In Journal of the IEEE Transactions on Audio, Speech, and Language Processing, vol. 20, Issue 2, Feb. 2012, pp. 486-498.

Heymann, et al., "BeamNet: End-to-end Training of a Beamformer-supported Multi-channel ASR System", In Proceedings of the IEEE International Conference on Acoustics, Speech and Signal Processing, Mar. 5, 2017, pp. 5325-5329.

Heymann, et al., "BLSTM Supported GEV Beamformer Front-end for the 3rd CHIME Challenge", In Proceedings of IEEE Workshop on Automatic Speech Recognition and Understanding, Dec. 13, 2015, pp. 444-451.

Higuchi, et al., "Deep Clustering-based Beamforming for Separation with Unknown Number of Sources", In Proceedings of the Interspeech, Aug. 20, 2017, 2 Pages.

Hori, et al., "Low-latency Real-time Meeting Recognition and Understanding using Distant Microphones and Omni-directional Camera", In Journal of IEEE Transactions on Audio, Speech & Language Processing, vol. 20, Issue 2, Feb. 2012, pp. 499-513.

Kolbaek, et al., "Multitalker Speech Separation with Utterance-level Permutation Invariant Training of Deep Recurrent Neural Networks", In Journal of IEEE/ACM Transactions on Audio, Speech and Language Processing, vol. 25, Issue 10, Oct. 2017, pp. 1901-1913.

Li, et al., "Acoustic Modelling for Google Home", In Journal of Interspeech, Aug. 20, 2017, pp. 399-403.

Li, et al., "Large Scale Domain Adaptation via Teacher-student Learning", In Proceedings of International Speech Communication Association, Aug. 20, 2017, 5 Pages.

Zmolikova, et al., "Learning Speaker Representation for Neural Network Based Multichannel Speaker Extraction", In Proceedings of the IEEE Automatic Speech Recognition and Understanding Workshop, Dec. 16, 2017, pp. 8-15.

Mohamed, et al., "Deep Bi-directional Recurrent Networks Over Spectral Windows", In Proceedings of IEEE Workshop on Automatic Speech Recognition and Understanding, Dec. 13, 2015, pp. 78-83.

Nesta, et al., "Convolutive BSS of Short Mixtures by ICA Recursively Regularized Across Frequencies", In Journal of IEEE Transactions on Audio, Speech, and Language Processing, vol. 19, Issue 3 Mar. 2011, pp. 624-639.

Povey, et al., "The Kaldi Speech Recognition Toolkit", In Proceedings of IEEE Workshop on Automatic Speech Recognition and Understanding, 2011, 4 Page.

Renals, et al., "Distant Speech Recognition Experiments Using the AMI Corpus", In Publication of New Era for Robust Speech Recognition, Jul. 26, 2017, pp. 355-368.

Sawada, et al., "Underdetermined Convolutive Blind Source Separation via Frequency Bin-wise Clustering and Permutation Alignment", In Proceedings of the IEEE Transactions on Audio, Speech, and Language Processing, vol. 19, Issue 3, Mar. 2011, pp. 516-527.

Seide, et al., "1-Bit Stochastic Gradient Descent and its Application to Data-Parallel Distributed Training of Speech DNNs", In Proceedings of the Fifteenth Annual Conference of the International Speech Communication Association, Sep. 14, 2014, pp. 1058-1062.

Souden, et al., "A Multichannel MMSE-based Framework for Speech Source Separation and Noise Reduction", In Journal of the IEEE Transactions on Audio, Speech and Language Processing, vol. 21, Issue 9, Sep. 2013, pp. 1913-1928.

Souden, et al., "On Optimal Frequency-domain Multichannel Linear Filtering for Noise Reduction", In Journal of IEEE Transactions on Audio, Speech, and Language Processing, vol. 18, Issue 2, Feb. 2010, pp. 260-276.

Vu, et al., "Blind Speech Separation Employing Directional Statistics in an Expectation Maximization Framework", In Proceedings of IEEE International Conference on Acoustics Speech and Signal Processing, Mar. 14, 2010, pp. 241-244.

Wang, et al., "A Maximum Likelihood Approach to Deep Neural Network Based Nonlinear Spectral Mapping for Single-channel Speech Separation", In Proceedings of 18th Annual Conference of the International Speech Communication Association, Aug. 20, 2017, pp. 1178-1182.

Xiong, et al., "Achieving Human Parity in Conversational Speech Recognition", In Microsoft Research—Technical Report No. MST-TR-2016-71, Oct. 2016, 13 Pages.

Yoshioka, et al., "Blind Separation and Dereverberation of Speech Mixtures by Joint Optimization", In Journal of IEEE Transactions on Audio, Speech, and Language Processing, vol. 19, Issue 1, Jan. 2011, pp. 69-84.

Yoshioka, et al., "Generalization of Multi-channel Linear Prediction Methods for Blind MIMO Impulse Response Shortening", In Journal of IEEE Transactions on Audio, Speech, and Language Processing, vol. 20, Issue 10, Dec. 2012, pp. 2707-2720.

Yoshioka, et al., "Multi-Microphone Neural Speech Separation for Far-field Multi-Talker Speech Recognition", In Microsoft AI and Research, One Microsoft Way, Apr. 17, 2018, 5 Pages.

Yoshioka, et al., "The NTT CHiME-3 System: Advances in Speech Enhancement and Recognition for Mobile Multi-Microphone Devices", In Proceedings of IEEE Workshop on Automatic Speech Recognition and Understanding, Dec. 13, 2015, pp. 436-443.

Zhang, et al., "Binaural Reverberant Speech Separation Based on Deep Neural Networks", In Proceedings of Interspeech, Aug. 20, 2017, pp. 2018-2022.

"International Search Report and Written Opinion Issued in PCT Application No. PCT/US2019/025686", dated Jul. 5, 2019, 13 Pages.

"Notice of Allowance issued in U.S. Appl. No. 15/226,527", dated Nov. 14, 2018, 19 Pages.

"Office Action Issued in European Patent Application No. 17726742.4", dated Apr. 28, 2020, 4 Pages.

"Final Office Action Issued in U.S. Appl. No. 15/805,106", dated May 23, 2019, 16 Pages.

"Non Final Office Action Issued in U.S. Appl. No. 15/805,106", dated Oct. 21, 2019, 13 Pages.

"Non Final Office Action Issued in U.S. Appl. No. 15/805,106", dated Dec. 14, 2018, 13 pages.

Bregman, Albert S., "Auditory Scene Analysis: The Perceptual Organization of Sound", In Journal of the Acoustical Society of America, Jan. 1990, 9 Pages.

Brown, et al., "Computational Auditory Scene Analysis", In Proceedings of Computer Speech & Language, vol. 8, Issue 4, Oct. 1994, pp. 297-336.

Chen, et al., "Cracking the Cocktail Party Problem by Multi-Beam Deep Attractor Network", In Proceedings of IEEE Automatic Speech Recognition and Understanding Workshop, Dec. 16, 2017, pp. 437-444.

Chen, et al., "Integration of Speech Enhancement and Recognition Using Long-Short Term Memory Recurrent Neural Network", In Proceedings of International Speech Communication Association, Sep. 6, 2015, 7 Pages.

Chen, et al., "Speaker-Independent Speech Separation with Deep Attractor Network", In Journal of Computing Research Repository, Jul. 12, 2017, 10 Pages.

Chen, et al., "Speech Enhancement by Sparse, Low-Rank, and Dictionary Spectrogram Decomposition", In Proceedings of IEEE Applications of Signal Processing to Audio and Acoustics, Oct. 20, 2013, 4 Pages.

Cherry, Colin E., "Some Experiments on the Recognition of Speech, with One and with Two Ears", In Journal of the acoustical society of America, vol. 25, No. 5, Sep. 1953, pp. 975-979.

Delcroix, et al., "Speech Recognition in the Presence of Highly Non-Stationary Noise Based on Spatial, Spectral and Temporal Speech/Noise Modeling Combined with Dynamic Variance Adaptation", In Proceedings of Machine Listening in Multisource Environments, Sep. 1, 2011, pp. 12-17.

Xue, et al., "Restructuring of Deep Neural Network Acoustic Models with Singular Value Decomposition", In Proceedings of the

(56) References Cited

OTHER PUBLICATIONS

14th Annual Conference of the International Speech Communication Association, Aug. 25, 2013, 5 Pages.
Ephraim, et al., "Speech Enhancement Using a Minimum Mean-Square Error Log-Spectral Amplitude Estimator", In Journal of IEEE Transactions on Acoustics, Speech, and Signal Processing, vol. 33, Issue 2, Apr. 1985, pp. 443-445.
Fevotte, et al., "BSS EVAL Toolbox User Guide Revision 2.0", In Technical Report of BSS EVAL Toolbox user Guide Revision 2.0, 2005, 22 pages.
Fevotte, et al., "Notes on Nonnegative Tensor Factorization of the Spectrogram for Audio Source Separation: Statistical Insights and Towards Self-Clustering of the Spatial Cues", In Proceedings of International Symposium on Computer Music Modeling and Retrieval, Jun. 21, 2010, pp. 102-115.
Elkow, Gary W., "Differential Microphone Arrays", In Chapter 2 "Differential Microphone Arrays" in Publication of Springer, Mar. 31, 2004, pp. 11-65.
Isik, et al., "Single-Channel Multi-Speaker Separation Using Deep Clustering", In Repository of https://arxiv.org/pdf/1607.02173.pdf, Jul. 7, 2016, 5 Pages.
Ito, et al., "Permutation-Free Convolutive Blind Source Separation via Full-Band Clustering Based on Frequency-Independent Source Presence Priors", In Proceedings of IEEE International Conference on Acoustics, Speech and Signal Processing, May 26, 2013, pp. 3238-3242.
Jaitly, et al., "Application of Pretrained Deep Neural Networks to Large Vocabulary Speech Recognition", In Proceedings of 13th Annual Conference of the International Speech Communication Association, 2012, 4 Pages.
Yu, et al., "Recent Progresses in Deep Learning Based Acoustic Models", In IEEE/CAA Journal of Automatica Sinica, vol. 4, Issue 3, Jul. 11, 2017, pp. 396-409.
Li, et al., "Learning Small-size DNN with Output-Distribution-based Criteria", In Proceedings of International Speech Communication Association, Sep. 14, 2014, pp. 1910-1914.
Miao, et al., "Simplifying Long Short-term Memory Acoustic Models for Fast Training and Decoding", In Proceedings of IEEE International Conference on Acoustics, Speech and Signal Processing, Mar. 20, 2016, pp. 2284-2288.
Mohammadiha, et al., "Supervised and Unsupervised Speech Enhancement Using Nonnegative Matrix Factorization", In Journal of IEEE Transactions on Audio, Speech, and Language Processing, vol. 21, Issue 10, Oct. 21, 2013, 12 Pages.
Narayanan, et al., "Ideal Ratio Mask Estimation Using Deep Neural Networks for Robust Speech Recognition", In Proceedings of International Conference on Acoustics, Speech and Signal Processing, May 26, 2013, pp. 7092-7096.
Smaragdis, Paris, "Blind Separation of Convolved Mixtures in the Frequency Domain", In Journal of Neurocomputing, vol. 22, Issue 1, Nov. 1998, 8 Pages.
"International Search Report and Written Opinion Issued in PCT Application No. PCT/US18/058067", dated Jan. 29, 2019, 14 Pages.
Sainath, et al., "Making Deep Belief Networks Effective for Large Vocabulary Continuous Speech Recognition", In Proceedings of the IEEE Workshop on Automatic Speech Recognition and Understanding, Dec. 11, 2011, pp. 30-35.
Sainath, et al., "Multichannel Signal Processing with Deep Neural Networks for Automatic Speech Recognition", In Journal of IEEE/ACM Transactions on Audio, Speech, and Language Processing, vol. 25, No. 5, May, 2017, 15 Pages.
Sak, et al., "Long Short-Term Memory Recurrent Neural Network Architectures for Large Scale Acoustic Modeling", In Proceedings of Fifteenth Annual Conference of the International Speech Communication Association, Sep. 14, 2014, pp. 338-342.
Sawada, et al., "A Robust and Precise Method for Solving the Permutation Problem of Frequency-Domain Blind Source Separation", In Proceedings of IEEE Transactions on Speech and Audio Processing, vol. 12, Issue 5, Aug. 16, 2004, 9 Pages.
Seide, et al., "Conversational Speech Transcription using Context-Dependent Deep Neural Networks", In Proceedings of the 12th Annual Conference of the International Speech Communication Association, Aug. 28, 2011, pp. 437-440.
Veen, et al., "Beamforming: A Versatile Approach to Spatial Filtering", In IEEE ASSP magazine, vol. 5, Issue 2, Apr. 1988, pp. 4-24.
Chen, et al., "Improving Mask Learning Based Speech Enhancement System with Restoration Layers and Residual Connection", In Proceedings of Conference of Interspeech, Aug. 2017, 5 Pages.
Xiao, et al., "Deep Beamforming Networks for Multi-Channel Speech Recognition", In Proceedings of IEEE International Conference on Acoustics, Speech and Signal, Mar. 20, 2016, 5 Pages.
Xiao, et al., "On Time-Frequency Mask Estimation for MVDR Beamforming with Application in Robust Speech Recognition", In Proceedings of IEEE International Conference on Acoustics, Speech and Signal Processing, Mar. 5, 2017, pp. 3246-3250.
"Non-Final Office Action Issued in U.S. Appl. No. 16/289,403", dated Jan. 27, 2021, 16 Pages.

* cited by examiner

ENVIRONMENT 100

ENVIRONMENT 200

MULTI-MICROPHONE SPEECH SEPARATION

BACKGROUND

When listening to a conversation, human listeners can typically discern the speaker of a given utterance. However, automated techniques for determining which utterances are attributed to specific speakers may have some drawbacks. In addition, there are numerous applications that could benefit from an automated speech separation system that can separate an audio signal with multiple speakers into separate audio signals for individual speakers. In particular, applications could benefit from an automated speech separation system that was robust in more difficult scenarios, e.g., when the number of speakers changes as people enter or leave a conversation, and/or when speech of two different speakers overlaps.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The description generally relates to techniques for speech recognition. One example includes a method or technique that can be performed on a computing device. The method or technique can include obtaining features reflecting mixed speech signals captured by multiple microphones. The method or technique can also include inputting the features to a neural network, obtaining masks output by the neural network, and applying the masks to at least one of the mixed speech signals captured by at least one the microphones to obtain two or more separate speaker-specific speech signals. The method or technique can also include outputting the two or more separate speaker-specific speech signals.

Another example includes a system that includes a hardware processing unit and a storage resource. The storage resource can store computer-readable instructions which, when executed by the hardware processing unit, cause the hardware processing unit to obtain features reflecting multiple mixed speech signals captured by multiple microphones. The computer-readable instructions can cause the hardware processing unit to normalize the features to obtain normalized features, input the normalized features to a speech separation model, and obtain, from the speech separation model, respective masks for individual speakers. The computer-readable instructions can cause the hardware processing unit to apply the respective masks to at least one of the mixed speech signals to obtain at least two separate speaker-specific speech signals for different speakers.

Another example includes a computer-readable storage medium storing instructions which, when executed by a processing device, cause the processing device to perform acts. The acts can include obtaining speaker-specific masks from a speech separation model. The speech separation model can produce the speaker-specific masks from input of at least two different microphones. The acts can include using the speaker-specific masks to derive respective speaker-specific beamformed signals, performing gain adjustment on the respective speaker-specific beamformed signals to obtain gain-adjusted speaker-specific beamformed signals, and outputting the gain-adjusted speaker-specific beamformed signals.

The above listed examples are intended to provide a quick reference to aid the reader and are not intended to define the scope of the concepts described herein.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

DETAILED DESCRIPTION

Overview

Figure 1:
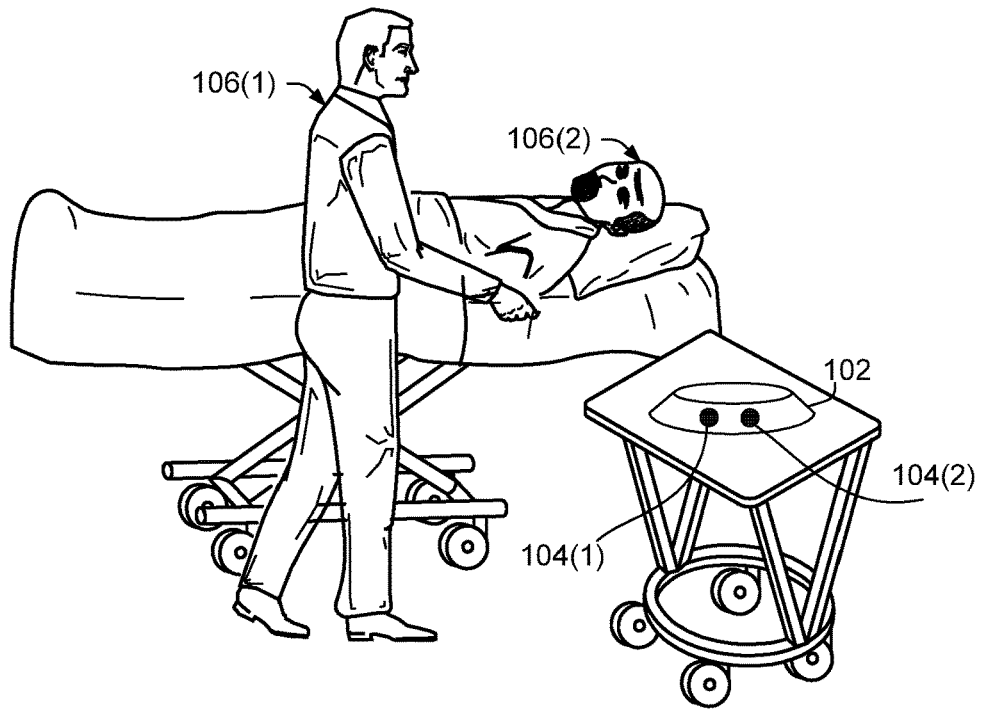
FIGS. 1 and 2 illustrate exemplary environments in which the disclosed implementations can be employed.

Automated separation of a mixed speech signal into underlying speaker-specific signals is useful, because some applications rely on knowing which words were spoken by each user. As noted above, however, automated speech separation can be difficult under various circumstances. For example, automated speech separation can be difficult when two or more users speak concurrently, e.g., there is some speech overlap where two users are speaking words at the same time. Note that in this context the term "mixed speech signal" refers to an audio signal that includes utterances from at least two different speakers. The term "speaker-specific speech signal" refers to an audio signal that has been processed to retain speech by a particular speaker and attenuate or eliminate speech by other speakers.

Some approaches to automated speech separation involve using prior knowledge of how many speakers are speaking. In other words, given a mixed speech signal captured by one or more microphones, and advance knowledge of how many users have spoken words that are audible in the mixed speech signal, these approaches can use the number of speakers as a constraint that allows individual speaker-specific signals to be recovered from the original mixed speech signal.

However, there are many important applications where it is not always feasible to determine the number of speakers in advance. For example, consider a meeting where individuals may be arriving or leaving at any time. Even when the number of the meeting attendees is known beforehand, the number of active speakers can change from time to time. Another example is a medical scenario where a patient may discuss sensitive health issues with one or more clinicians, family members, and/or other caregivers, and it can be important to attribute each utterance to the particular speaker. While automated approaches may be used to detect the number of speakers at any given time, these approaches generally are not sufficiently well-developed to enable development of robust speech separation systems.

Alternative approaches to speech separation can use a single microphone to obtain a mixed speech signal for a variable number of speakers, and separate the mixed speech signal into speaker-specific signals without advance knowledge of the number of speakers. For example, some approaches might define a fixed number of outputs, e.g., of a neural network, and use a subset of the outputs to represent individual speakers. Other outputs can produce null values that do not represent any speaker. These approaches can accommodate any number of speakers up to the total number of outputs, but are not designed to handle speech signals from multiple microphones.

The disclosed implementations provide mechanisms for speech separation that can utilize mixed speech signals from multiple microphones, without advance knowledge of the number of speakers. In other words, each microphone can provide a separate audio signal, any or all of those audio signals can include utterances by individual speakers, and the utterances can have different magnitudes. To perform speech separation on mixed speech signals obtained from multiple microphones, the disclosed implementations can extract features from individual mixed speech signals captured by the respective microphones. The extracted features can be input to a trained speech separation model, such as a neural network or other model that outputs time-frequency masks for individual speakers. These time-frequency masks can be used to recover separate, time-synchronous speaker-specific speech signals for each speaker. In some cases, the input features can include phase information as well as magnitude information. The phase differences between different microphones can indicate the speaker directions from the microphones, which can be leveraged by the speech separation model. In some cases, using the phase information reflecting the speaker directions can allow the speech separation model to obtain more accurate masks than when only features from a single microphone are used.

Example Scenarios

FIG. 1 illustrates an environment 100 in which the disclosed implementations can be employed. Environment 100 includes a microphone array 102 with multiple microphones 104(1) and 104(2), which can record speech by users 106(1) and 106(2). For example, environment 100 can represent a health care scenario, where a patient and one or more caregivers may have a conversation with one another. The disclosed implementations may obtain mixed speech signals from each of the respective microphones and process the mixed speech signals to obtain respective speaker-specific speech signals for each of the users.

Figure 2:
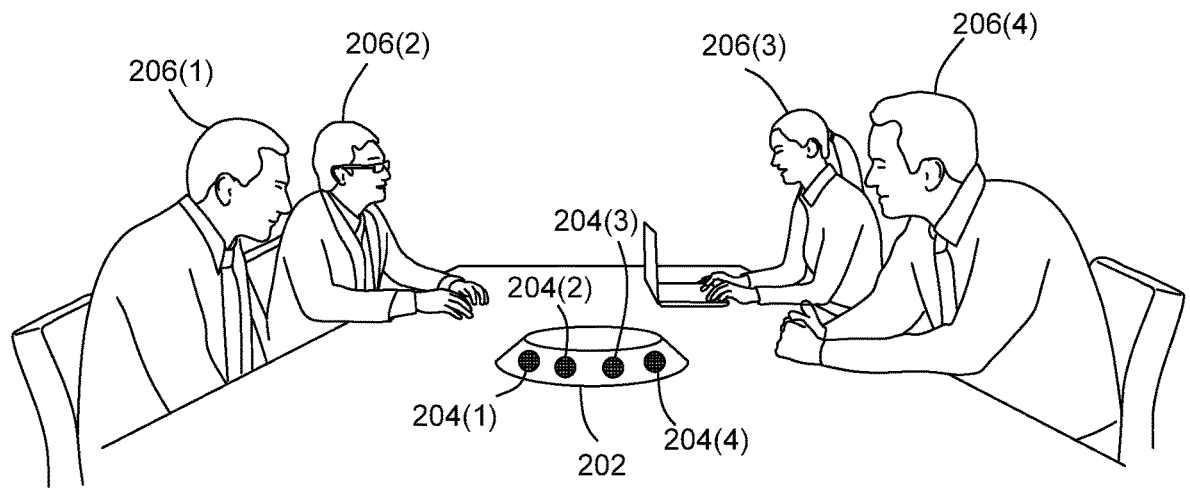

FIG. 2 illustrates an environment 200 in which the disclosed implementations can be employed. Environment 200 includes a microphone array 202 with multiple microphones 204(1), 204(2), 204(3), and 204(4), which can record speech by users 206(1), 206(2), 206(3), and 206(4). For example, environment 200 can represent a meeting scenario, where employees of a company have a meeting to discuss a work-related issue such as an upcoming product release. The disclosed implementations may obtain mixed speech signals from each of the respective microphones and process the four mixed speech signals to obtain respective speaker-specific speech signals for each of the users. Note, however, that any number of users and any number of microphones may be employed. For example, some implementations, not shown, may employ fewer microphones than speakers. Also, note that FIGS. 1 and 2 illustrate various microphones as discrete devices for illustration purposes, but the disclosed implementations can be performed with microphone arrays and/or individual microphones that are provided in other devices, e.g., laptop computers, and/or smart phones.

Although health care and meeting environments are depicted, the disclosed implementations can be employed in various other environments, such as at parties or other gatherings where people mingle and talk, at sporting events, at concerts, etc. In these various environments with multiple speakers, it can be useful to separate a mixed speech signal into individual speaker-specific signals. For example, once speech is separated into speaker-specific signals, it is possible to determine what words were spoken by individual speakers, e.g., using speech recognition technologies. The disclosed implementations can be used for various applications that involve determining which words were spoken by individual speakers. For example, in some cases, a transcript can be generated in such a way that identifies which words were spoken by which speakers. In environments where users have privacy concerns, the identities of the speakers can be concealed in the transcript, e.g., as "speaker 1," "speaker 2." In environments where it is useful to know the identities of the speakers, the identities of the speakers can be included in the transcript, e.g., by name, employee number, or another user identifier. In some cases, speaker identification techniques can be applied to the speaker-specific speech signals obtained using the disclosed techniques. Speaker identification techniques can use voice profiles of individual speakers to identify the speaker of a given signal. Additional applications of the disclosed speech separation techniques are discussed further herein.

Example Method

Figure 3:
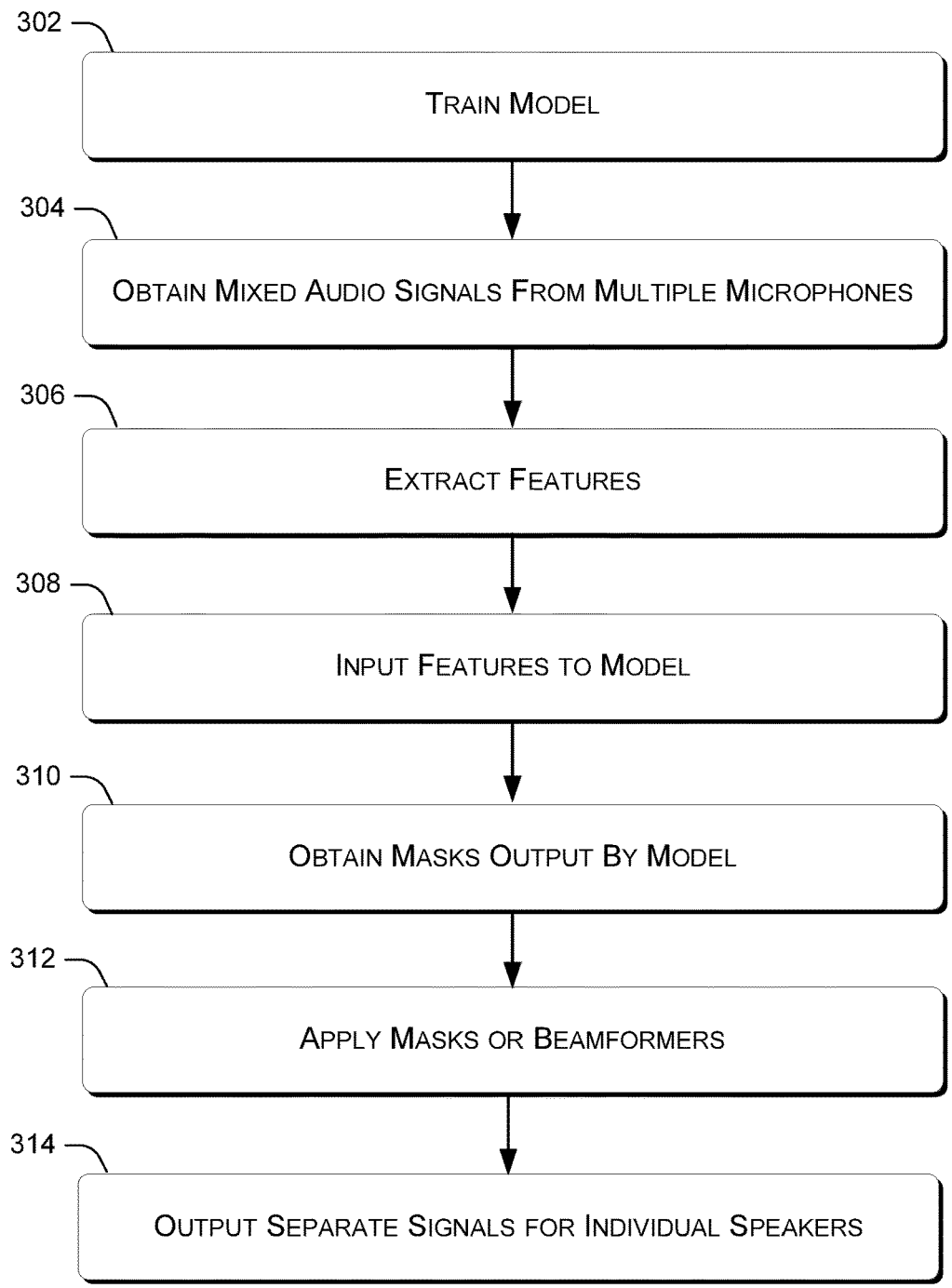
FIG. 3 illustrates an example method or technique, consistent with some implementations of the present concepts.

The following discussion presents an overview of functionality that can allow multi-microphone speech separation to be performed. FIG. 3 illustrates an exemplary method 300, consistent with the present concepts. As discussed more below, method 300 can be implemented on many different types of devices, e.g., by one or more cloud servers, by a client device such as a laptop, tablet, or smartphone, or by combinations of one or more servers, client devices, etc. In some cases, method 300 can also be implemented directly on an individual microphone provided with appropriate processing resources, as discussed elsewhere herein.

At block 302, a speech separation model can be trained. For example, training data can be obtained that includes multi-microphone audio of mixed speech signals, as well as known good masks that can be correctly used to derive separate audio signals of individual speakers. The training data may be created by computer simulation. The speech separation model can be a neural network, a support vector machine, or other machine-learning model. Generally, the training can proceed by using the training data as a supervisory signal to learn weights, coefficients, or other parameters of the speech separation model.

At block 304, mixed speech signals can be obtained from multiple microphones. As noted previously, an individual audio signal from a given microphone may be considered "mixed" by virtue of having utterances, potentially concurrent or overlapping, by multiple speakers in the individual audio signal.

At block 306, features can be extracted from the audio signals recorded by each microphone. For example, each audio signal from a given microphone can be separated into 32-millisecond segments. For each segment, a certain number (e.g., 257) of frequency bins can be defined, and the features for that segment can include the Fourier transform coefficients (both magnitude and phase) for each frequency bin. In some cases, block 306 can also include further processing of the features, such as deriving inter-microphone phase differences (IPDs) or other values to use as features and/or normalizing the features as discussed elsewhere herein.

At block 308, the features can be input to the speech separation model. The model can be applied to the features obtained from the entire audio input (e.g., the entire the length of the recorded audio) or a "window" of the features. For example, the features for each segment can be combined in a vector that represents a total of 2.4 seconds worth of data, referred to herein as a "window." In each iteration of the speech separation model, the window can be moved forward a specified amount, e.g., 0.6 seconds. This can be particularly useful when the input audio is long, as may be the case with the meeting scenario.

At block 310, time-frequency masks can be obtained as the output of the speech separation model. For example, the masks can take values between 0 and 1, with a 0 representing a speaker that is not speaking and a 1 representing a speaker that is dominant at the corresponding time-frequency point, and values between 0 and 1 being proportional to the extent with which the model believes the speaker to be dominant. Each output node represents one speaker or, alternatively, a null speaker. The association between the output nodes and the speakers may change from time to time. Therefore, in some implementations, masks for adjacent windows can also be stitched together.

At block 312, the masks can be applied to at least one mixed speech signal from at least one of the microphones. In one example, the masks are applied directly to a time-frequency representation (e.g., a power spectrogram) of one or more of the original microphone signals, e.g., by multiplying the masks by respective power spectrograms representing the original microphone audio outputs. Alternatively, the masks can be utilized to derive beamformers, which can be applied to one or more of the original microphone signals. Applying the masks or using beamformers can result in separate speaker-specific signals, each representing speech by one speaker, where the speech by that speaker is retained and speech by all the other speakers is attenuated or removed. Note that in the case of beamformers, a gain adjustment can also be applied to the beamformed signal at block 312, as discussed elsewhere herein.

At block 314, the speaker-specific signals can be output separately. For example, a first speaker-specific signal can be output representing speech by a first speaker, a second speaker-specific signal can be output representing speech by a second speaker, a third speaker-specific signal can be output representing speech by a third speaker, etc.

Note that some implementations utilize synchronized microphones, e.g., that have a shared clock used to time-stamp individual segments. The clock can be a local hardware clock shared by the microphones, e.g., in the case of a microphone array where each individual microphone is connected to a common bus. In other implementations, a network clock synchronized using a network synchronization protocol can be used as a shared logical clock by multiple microphones that communicate over a network, via short-range wireless, etc. In implementations where the model includes a neural network, the neural network can include a Bidirectional Long Short Term Memory (BLSTM) structure that takes account of long-term acoustic context, e.g., over sliding windows (e.g., 2.4 seconds long) of input features for each microphone.

Example Input Data

One way to input the features to the speech separation model, for either training purposes or for speech separation, is as follows. For each microphone, transform the audio signal output by that microphone into a time-frequency representation using a time-frequency transform. For example, the time-frequency representation can be obtained using a short-time Fourier transform, a modified discrete cosine transform, and/or sub-band signal decomposition. In some implementations, the audio signal output by a given microphone is segmented into 32-millisecond segments with a shift of 16 milliseconds. The time-frequency transform can have a specified number of frequency bins, e.g., 257. Thus, for a given segment for a given microphone, the features can include 257 magnitude and phase values output by the transform.

Assuming a system with 7 microphones, this results in 7 separate sets of 257 magnitude and phase features for each segment, one set for each microphone. Now, assuming a 2.4 second window, each window is 150 segments long. Thus, each iteration of the speech separation model can process one window or 150 segments worth of features at a time, outputting 150 sets of time-frequency masks for 2.4 seconds worth of data.

Figure 4A:
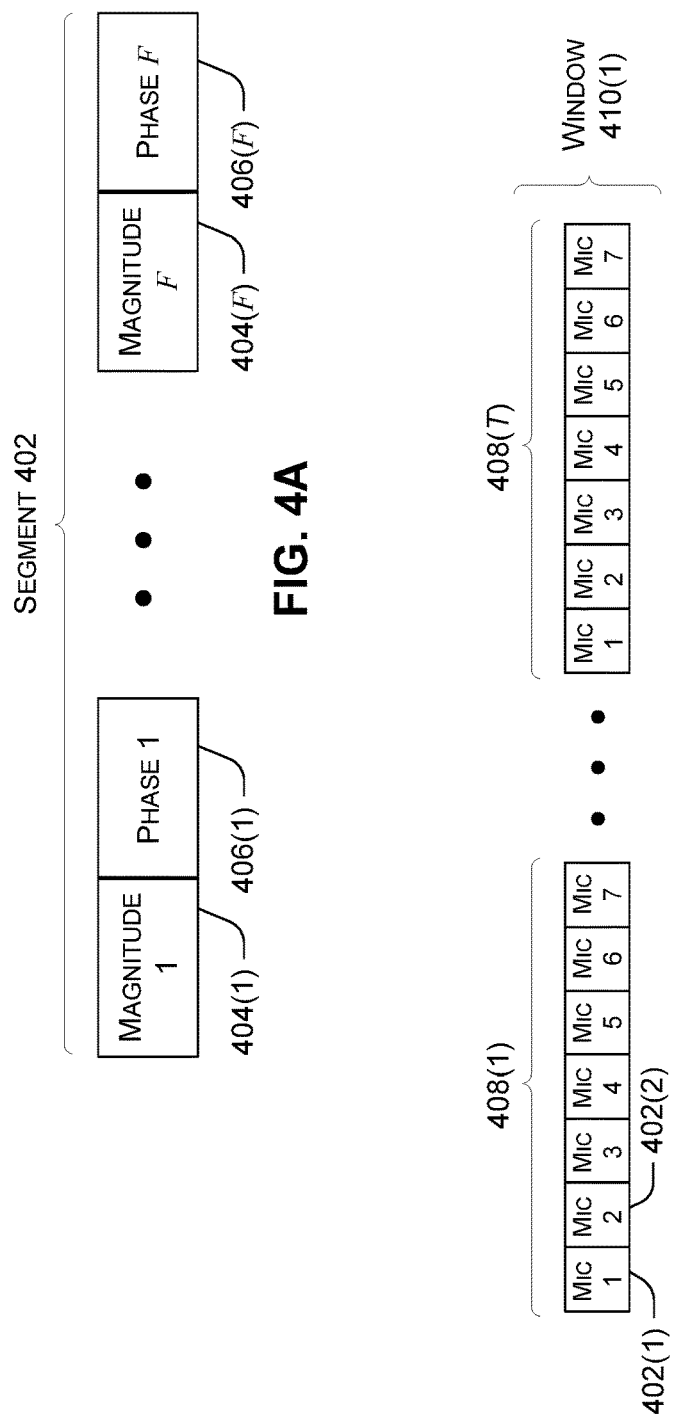
FIGS. 4A and 4B illustrate exemplary input features, consistent with some implementations of the present concepts.
Figure 4B:
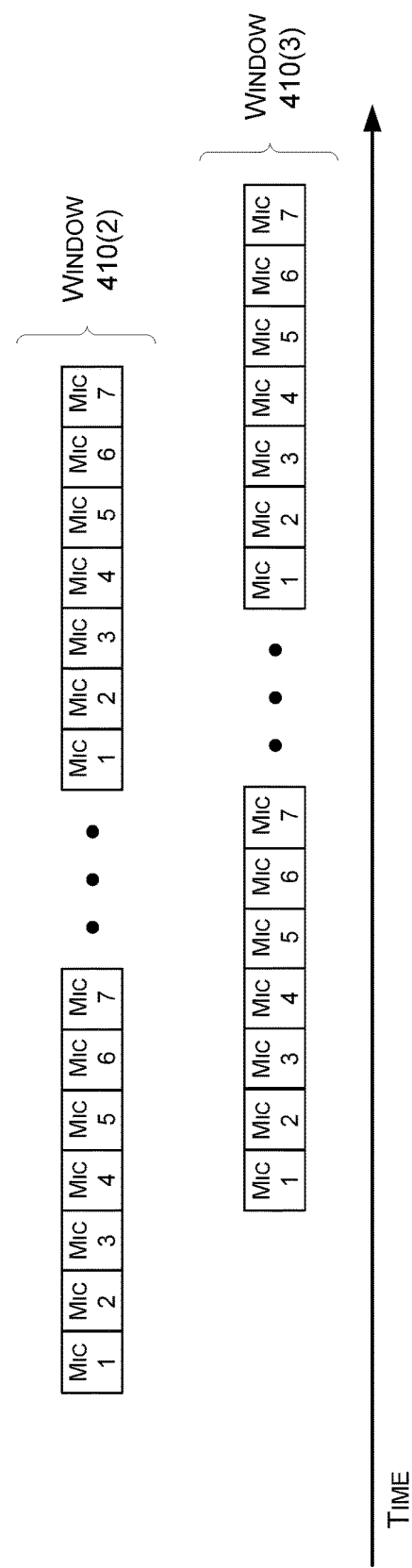

FIGS. 4A and 4B illustrate exemplary input data as discussed above. FIG. 4A illustrates a single time segment 402 for a single microphone using a transform with F frequency bins. Each frequency bin has a corresponding magnitude value 404 and phase value 406. Thus, in the case where F is 257 and the time segments are 32 milliseconds long, each 32 millisecond segment includes 257 magnitude values and 257 phase values. For example, magnitude 404(1) can represent the magnitude output by the transform for the lowest frequency bin, phase 406(1) can represent the phase output by the transform for the lowest frequency bin, magnitude 404(F) can represent the magnitude output by the transform for the highest frequency bin, and phase 406(F) can represent the phase output by the transform for the highest frequency bin.

FIG. 4B illustrates exemplary microphone groups 408, which can be obtained by concatenating respective time segments for each of the microphones. For each time segment, each microphone group includes a set of features 402(1) for microphone 1, a set of features 402(2) for microphone 2, and so on. For example, in implementations with 32 millisecond time segments and 7 microphones, each microphone group 408 represents 32 milliseconds worth of magnitude and phase values for 7 different microphones. Assuming there are T time segments per window and 7 microphones, the input data for a given window can be input to the speech separation model by starting with a microphone group 408(1) representing features for the 7 microphones for the first segment, and end with microphone group 408(T) representing features for the 7 microphones for the Tth segment.

As noted above, a sliding window can include T consecutive time segments of a given length, e.g., for a 2.4 second sliding window with 16-millisecond shift, T=150. FIG. 4B shows a first window 410(1), a second window 402(2), and a third window 402(3). Generally, each subsequent window can be shifted in time relative to the previous window, but a portion of each subsequent window can overlap with the previous window to some extent.

Example Masks

The trained speech separation model can process the features of the segments window-by-window, and output window-sized blocks of masks. This enables the model to take account of longer-term acoustic context provided by the duration of each sliding window. The trained model can output individual masks as real values between 0 and 1, for each time-frequency point. Thus, in implementations with the above-described configuration, the mask for a given speaker for a given window can include 150 consecutive sets of 257 values between 0 and 1.

Figure 5:
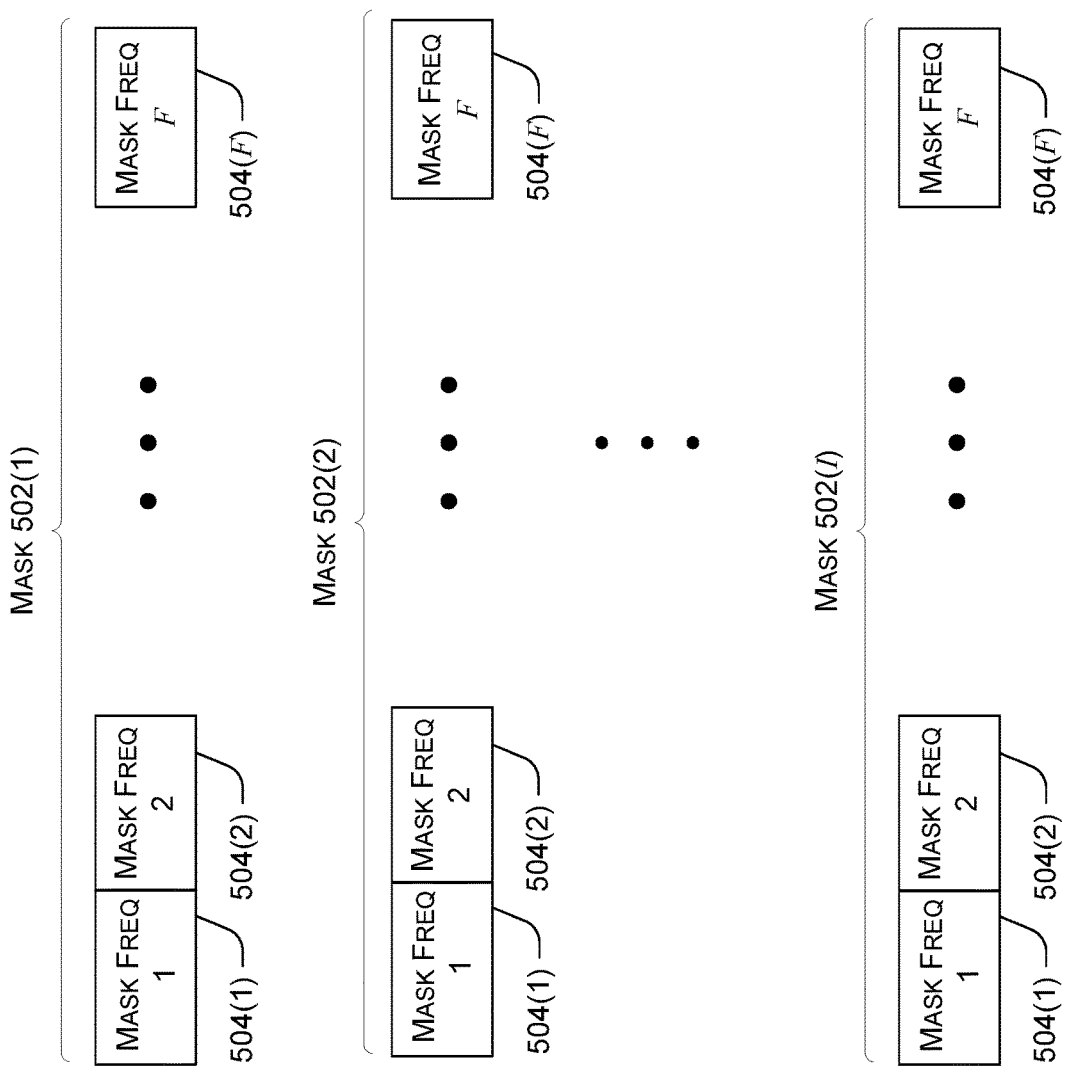
FIG. 5 illustrates exemplary time-frequency masks, consistent with some implementations of the present concepts.

FIG. 5 illustrates exemplary output data for a speech separation model having I outputs. For a given time segment, mask 502(1) represents a first speaker, mask 502(2) represents a second speaker, and so on, with mask 502(I) representing an $I_{th}$ speaker. Note that I is the number of model outputs, not necessarily the number of speakers. As long as I equals or exceeds the number of speakers, the speech separation model can accommodate any number of speakers without knowing the number in advance. Note that each mask includes a mask frequency 504(1) for the first frequency bin, a mask frequency 504(2) for the second frequency bin, and so on up to a mask frequency 504(F) for the last frequency bin.

In FIG. 5, mask 502(1) represents the first output of the speech separation model for a given segment, mask 502(2) represents the second output of the speech separation model for that segment, and so on. Over a given sliding window, the masks output by a given output of the speech separation model represent the same user for all time segments in that sliding window. However, for a subsequent sliding window, each output of the speech separation model might represent a different speaker. To ensure a consistent stream of masks for each speaker, a segment stitching process discussed elsewhere herein can be applied to make the masks for neighboring windows consistent.

Obtaining Training Data

One way to obtain training data for training the neural network is to use corpora of speech signals of single users and process the speech signals to obtain a mixed speech signal. For example, a number of speakers can be chosen, e.g., at random. Then, those signals can be reverberated, mixed, and further processed, for example, to simulate ambient noise or microphone characteristics. For example, assume the random number of speakers is two. Speech signals for two different users can be obtained from the corpora, and utterances in the corpora from those users can be started and ended at random times. These randomly-timed speech signals can then be reverberated and mixed together, and then noise can be added to the mixed speaker signal. In some implementations, the training samples can be clipped to a specific length, e.g., 10 seconds.

Model Structure

In some implementations, the speech separation model can include a neural network with multiple BLSTM layers. Such a neural network can also include other layer types, as discussed more below.

Figure 6:
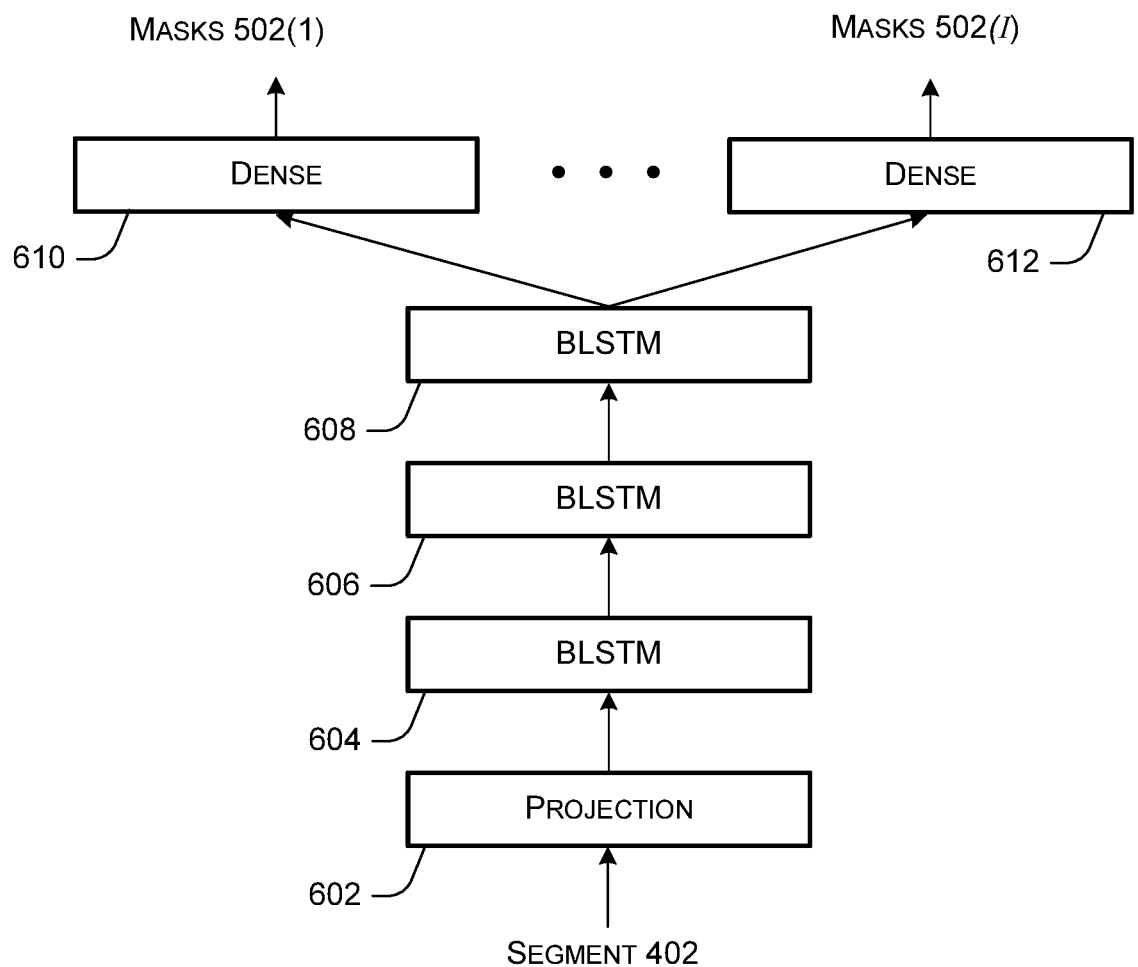
FIG. 6 illustrates an example model structure, consistent with some implementations of the present concepts.

FIG. 6 shows an example speech separation model 600. In this example, the speech separation model has a neural network structure with a projection layer 602, BLSTM layers 604, 606, and 608, and parallel dense layers 610 and 612. The projection layer can transform the input vector for each segment 402, as shown in FIG. 4B, to a smaller dimensionality, e.g., 1024 inputs. The projection layer may have ReLU (rectified linear unit) nonlinearity, and the parallel dense layers 610 and 612 may have sigmoid nonlinearity. Also, note that the parallel dense layers 610 and 612 may, in some implementations, produce noise masks as well.

Generally, BLSTM layers of the speech separation model can accommodate variable-length inputs. The output of one BLSTM layer may be fed back into the same layer, thus allowing the BLSTM layers to "remember" the past and future context when processing a given stream of audio segments. This generally allows the network to use the surrounding context of a given segment, e.g., segments before and after the current input segment, to contribute to the determination of the mask for the current input segment.

Network Training Process

Some implementations use permutation-invariant training (PIT) for training the speech separation model, e.g., for neural network implementations. Generally, PIT involves inputting a sequence of feature vectors of a mixed speech signal as input (e.g., as shown above in FIGS. 4A and 4B) and generating a fixed number of time-frequency (TF) mask sequences (e.g., as shown above in FIG. 5). In some implementations, the generated masks can be applied to the mixed speech signal from one the microphones to extract each of the speaker-specific signals of individual speakers. As noted above, the speech separation model can have multiple output channels, each of which generates a mask sequence for one speaker.

As noted, some implementations involve the use of a BLSTM network which has layers to take account of long-term acoustic context. The input feature vector can be denoted by $y_t$ with t being a short time frame index, e.g., the 32 millisecond segments discussed above. The time-frequency mask of the $i^{th}$ output sequence can be represented as $m_{i,t,f}$, where f is a frequency bin index ranging from 1 to F, with F being the number of frequency bins. A vectorform notation: $m_{i,t}=[m_{i,t1}, \ldots, m_{i,tF}]^T$ can be used to represent the masks belong to the $t^{th}$ segment as a vector. The speech separation model can take in a sequence of segments (e.g., the sliding windows mentioned above) designated herein as $(a_t)t \in T$. The speech separation model can then emit $(m_{i,t})$ $t \in T$ from each of the I output channels, where T represents the number of segments within a window and i is an output channel index.

In some implementations, the speech separation model is trained without prior knowledge of which output channel corresponds to which speaker. To take account of this ambiguity, the PIT training process can examine the possible attributions of output channels to speakers, and select the best attribution (or output channel permutation) to invoke gradient descent learning. One loss function that can be used is:

$$L = \min_{J \in perm(I)} \sum_{i=1}^{I} \sum_{t \in T} l(m_{j_i,t} \odot Y_t, X_{i,t}), J = (j_1, \ldots, j_I)$$

where perm(I) produces all possible permutations for a sequence $(1, \ldots, I)$, $\odot$ denotes element-wise multiplication, and $Y_t$ and $X_{i,t}$ are the power spectra of the mixed speech signal and the $i^{th}$ speaker-specific signal, respectively. Note that, during training, the speaker-specific signals are available for all speakers. The function $l(X,Y)$ measures the degree of discrepancy between two power spectra, X and Y. One possible definition of $l(X,Y)$ is the squared error, which can be written as:

$l(X,Y)=|X-Y|^2$

Note that, at the time of separation, the permutation determination can take place at a sliding window level instead of a segment level. This can discourage the network from swapping speakers at every short time frame segment, thereby letting the network learn to jointly separate and track individual speaker signals within a window. Thus, PIT allows the network to learn to figure out which output channel to use for each speaker. Therefore, the resultant trained network is not hardwired to certain speakers, i.e., it is speaker-independent. When the number of speakers, K, is smaller than the number of output channels, I, $X_{i,t}$ can be set to zero for i>K.

Various input features can be used as input to the speech separation model, including those mentioned previously with respect to FIGS. 4A and 4B and/or other features. For example, short time power spectra, log power spectra, linear mel spectra, log mel spectra, etc., can be employed as input features. In addition, phase-related features extracted from multiple microphones can be used. In some implementations, multi-microphone inputs are provided to the model with both magnitude and phase spectra obtained from each microphone, as discussed above with respect to FIGS. 4A and 4B. In other implementations, spatial features such as IPDs with respect to a reference microphone can be used. By using the first microphone as the reference, the IPDs can be calculated as:

$$\angle\left(\frac{y_{j,tf}}{y_{R,tf}}\right), i \neq R$$

where $y_{j,tf}$ denotes the STFT coefficient, or any other time-frequency representation, of the jth microphone signal. Normalizing input data with respect to the reference microphone R in this manner can mitigate or eliminate phase variations inherent in source signals, and hence allow the acoustic characteristics of a room where the microphones are located to be directly captured. The IPD features can be concatenated with magnitude spectra to leverage both spectral and spatial cues. Thus, the magnitude spectra from each of the microphones and the IPDs between the reference microphone and each of the other microphones can be used as input features.

In some implementations, the speech separation model can be trained on a collection of artificially created reverberant speech mixtures. Each speech mixture can be generated by randomly picking up speech utterances from a clean speech corpus and mixing them at a random signal to noise ratio. Each speech utterance can be padded with a random number of zeros so that they start at different time points. Also each speech utterance may be artificially reverberated before being mixed. The mixed signal can be further mixed with a background noise signal and filtered mimicking a microphone frequency response. The background noise signal may be taken from a noise corpus or randomly generated on a computer. Then, the mixed signals can be clipped to a specified length, e.g., 10 seconds, and used to train the model.

Feature Normalization

Some implementations may normalize the input features for use by a separation model. For example, mean and variance normalizations can be applied to the features, including the IPD features and the power spectra. These kinds of normalization can facilitate the model training process by reducing feature variations. In some applications, mean normalization without variance normalization can be applied to the IPD features. Clusters in the IPD feature vector space can represent speakers or other spatially isolated sound sources. Because variance normalization alters feature vector distributions, doing variance normalization on the IPD features might hinder the speech separation model from finding clusters corresponding to speakers. In some cases, the features are mean-normalized by using a rolling window, e.g., of four seconds.

In some applications, to prevent aliasing at the π/−π boundary, the mean-normalized IPD features can be calculated as:

$$\text{Arg}\left(\frac{y_{j,tf}}{y_{R,tf}} - E_\tau\left(\frac{y_{j,\tau f}}{y_{R,\tau f}}\right)\right), j \neq R$$

where the time averaging operator, $E_\tau$ is applied over the normalization window. R is the index of an arbitrary chosen reference microphone, e.g., the first microphone. Generally speaking, normalizing as discussed above can help speech separation model training, e.g., improve accuracy and/or speed up convergence relative to implementations that do not normalize the input features.

Window Stitching Processing Flow

Figure 7:
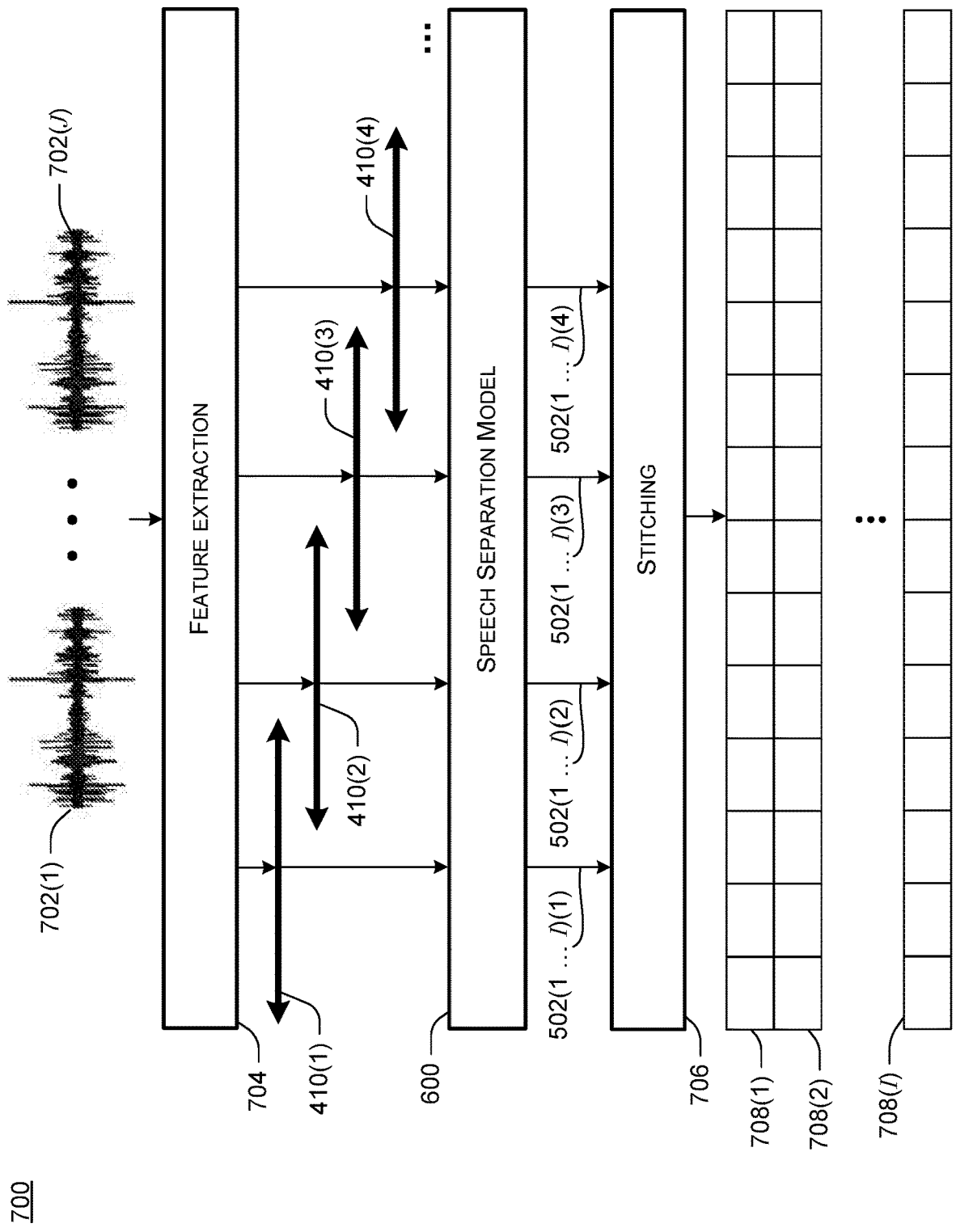
FIGS. 7 and 8 illustrate exemplary processing flows, consistent with some implementations of the present concepts.

FIG. 7 shows a window stitching processing flow 700. In FIG. 7, input signal 702(1) represents a mixed speech signal from a first microphone, and input signal 702(J) represents a mixed speech signal from a $J^{th}$ microphone. As previously noted, these signals can be obtained at block 304 of method 300.

FIG. 7 also shows feature extraction 704, corresponding to block 306 of method 300. Generally, the feature extraction process can result in input data such as shown in FIGS. 4A and 4B. As previously noted, the input data can be input to the speech separation model 600 on a sliding window basis, as shown by windows 410(1), 410(2), 410(3), and 410(4) in FIG. 7. Speech separation model 600 can process each window to output masks 502(1) through 502(I) for each window, where I represents the number of output channels of the speech separation model. Thus, in FIG. 7, 502(1 . . . I)(1) represents masks 1 through I, one for each model output, for a first time window, 502(1 . . . I)(2) represents masks 1 through I for a second time window, 502(1 . . . I)(3) represents masks 1 through I for a third time window, and 502(1 . . . I)(4) represents masks 1 through I for a fourth time window.

As noted above, when the speech separation model 600 is a PIT-trained neural network, the speech separation model does not necessarily order the output masks so that the same speaker is represented by the same output across window boundaries. Thus, it is possible that for a previous window, the first output of the model represents a speaker A and the second output represents a speaker B, and that for a subsequent window, the first output of the model represents speaker B and the second output represents speaker A.

To address this, FIG. 7 shows a stitching process 706. In the stitching process, masks that are output from each window are aligned on a speaker-by-speaker basis after being output from the speech separation model. In the previous example, this could be done by (1) concatenating the masks produced by the first output in the previous window with the masked produced by the second output in the subsequent window ad (2) concatenating the masks produced by the second output in the previous window with the masks produced by the first output in the subsequent window.

FIG. 7 shows masks streams 708(1), 708(2) . . . 708(1) output by the stitching process 706. Assume for the following discussion that I, the number of model outputs, is four. In this case, the masks output by the speech separation model 600 are produced by one of four outputs, but for any two windows, the speech separation model may output masks for different speakers from the same model output.

One way to decide which masks to align across window boundaries is as follows. Suppose that the speaker-to-mask permutations have already been determined up to the previous window. To decide the mask assignments for the current window, some implementations calculate the cost of each possible permutation and pick the permutation that provides a relatively low cost, e.g., the lowest cost. Here, the cost can be defined as the sum of the squared differences between the separated signals of the adjacent windows obtained by directly applying the masks to a mixed-speech signal provided by a given microphone, e.g., the reference microphone noted earlier. The sum of squared differences can be computed over the overlapping segments of the two adjacent windows. In general, because the windows overlap in time, the overlapping portion of the separated signals for a given speaker should be relatively more similar than for separated signals of different speakers.

Beamforming

As noted, one way to obtain speaker-specific speech signals is to multiply the masks output by the speech separation model by the original audio signal from one or more of the microphones. This technique can provide perceptually enhanced sounds, e.g., humans may prefer listening to speaker-specific speech signals produced by applying the masks directly to the original mixed speech signal as captured by one of the microphones, e.g., the reference microphone. On the other hand, this approach can introduce artifacts that make automated speech recognition of the resulting speaker-specific signals more difficult. Thus, some implementations derive beamformers that can be applied to the original audio signals instead, since this approach may mitigate the introduction of artifacts that can occur when masks are applied directly.

With beamforming, the beamformed speaker-specific signals can be computed as:

$$u_{i,tf} = w_{c,i,f}^H y_{tf}$$

where $w_{c,i,f}$ is a beamformer coefficient vector for output channel i, $y_{tf}$ is a vector stacking the microphone signals as $y_{tf} = [y_{1,tf}, \ldots, y_{J,tf}]^T$, and c is the window index to which $u_{i,tf}$ belongs. Some implementations use a minimum variance distortionless response (MVDR) approach to derive a potentially optimal beamformer, $w_{c,i,f} = \Psi_{c,i,f}^{-1} \phi_{c,i,f} e / \rho_{c,i,f}$, where the normalization term, $\rho_{c,i,f}$, is calculated as $\rho_{c,i,f} = tr(\Psi_{c,i,f}^{-1} \phi_{c,i,f})$. Here, e is the J-dimensional standard basis vector with 1 at a reference microphone position and J being the number of microphones. The two matrices, $\phi_{c,i,f}$ and $\Psi_{c,i,f}^{-1}$, represent the spatial covariance matrix of the utterance to be output from the $i^{th}$ channel (which may be referred to as the target utterance) and that of the sounds overlapping the target. These matrices can be estimated as weighted spatial covariance matrices of the microphone signals, where each microphone signal vector can be weighted by $m_{i,tf}$ for the target or $1 - m_{i,tf}$ for the interference.

The spatial covariance matrix estimator that uses $1 - m_{i,tf}$ as the interference mask may exhibit some deficiencies in accuracy, e.g., in implementations when the trained speech separation model is specifically trained to optimize the target signal estimation accuracy. A more accurate estimate of the interference spatial covariance matrix can potentially be obtained by explicitly factorizing it to the spatial covariance matrix of the other talker's speech and that of the background noise, $\phi_{c,N,f}$, as follows:

$$\Psi_{c,i,f} = \Phi_{c,\bar{i},f} + \Phi_{c,N,f}$$

where $\bar{i} = 0$ for $i = 1$ and $\bar{i} = 1$ for $i = 0$ in the case where the speech separation model has two output channels.

To obtain $\phi_{c,N,f}$, some implementations add another output channel to the speech separation model so that the noise masks can also be obtained. In such implementations, the PIT framework can be used for designated speech output channels, and one or more separate noise channels are also employed. For example, a neural network such as shown in FIG. 6 can be augmented with one or more dedicated noise channels. The loss function of such a neural network can be defined as the sum of the PIT loss and the squared error in noise estimation. A sig-cov method, discussed more below, can be used when computing the spatial covariance matrices, and gain adjustment techniques can be applied to reduce insertion errors when the disclosed techniques are applied to automated speech recognition.

The spatial covariance matrices introduced above may be calculated by using the masks in two different ways. One scheme, dubbed as mask-cov, picks up time-frequency bins that are dominated by the target or interfering speakers and calculates the covariance matrices by using these time-frequency points. Specifically, mask-cov uses the following estimators:

$$\phi_{c,i,f} = \frac{1}{\sum_{t \in T} m_{i,tf}} \sum_{t \in T} m_{i,tf} y_{tf} y_{tf}^H$$

$$\phi_{c,\bar{i},f} = \frac{1}{\sum_{t \in T}(1 - m_{i,tf})} \sum_{t \in T}(1 - m_{i,tf}) y_{tf} y_{tf}^H$$

where the summations in the right hand sides are calculate within the cth window.

One potential drawback of the mask-cov scheme is that it could result in biased estimates of the covariance matrices because the statistics are computed from nonrandom samples. Another scheme, referred to herein as sig-cov, calculates estimates of individual speaker-specific signals by applying the masks to each original microphone signal and then computing the spatial covariance matrices from these signal estimates. This may yield less biased estimates relative to mask-cov.

As set forth above, three schemes are provided for producing speaker-specific speech signals. A first scheme, time-frequency masking, involves direct application of time-frequency masks to the original mixed speech signal. In addition, two schemes for deriving beamformers from the masks are also provided, a mask-cov scheme, and a sig-cov scheme. These beamformers can be used to obtain separate speaker-specific beamformed signals.

Beamformer Gain Adjustment

Generally, MVDR beamforming results in a unit gain toward a certain direction. Therefore, even when the masks of a particular output channel are zero almost everywhere, implying the channel does not contain speech, the beamformer may not adequately filter out the speech signals especially under reverberant conditions. Some implementations can alleviate this by modifying the gain of the beamformed signal with that of the masked signal obtained by directly applying the masks to an original microphone signal as follows:

$$u_{i,tf}^* = u_{i,tf} \frac{E_i}{\max_{j \in [1,I]} E_j}, \text{ where } E_i = \sqrt{\sum_{t,f} \|m_{i,tf} y_{R,tf}\|^2}$$

$u_{i,tf}^*$ is a final estimate of the short-time Fourier transform coefficient of one of the speaker signals. This can be converted to a time-domain signal and fed into another system, such as a speech recognition system, for further processing.

Transcription System

Figure 8:
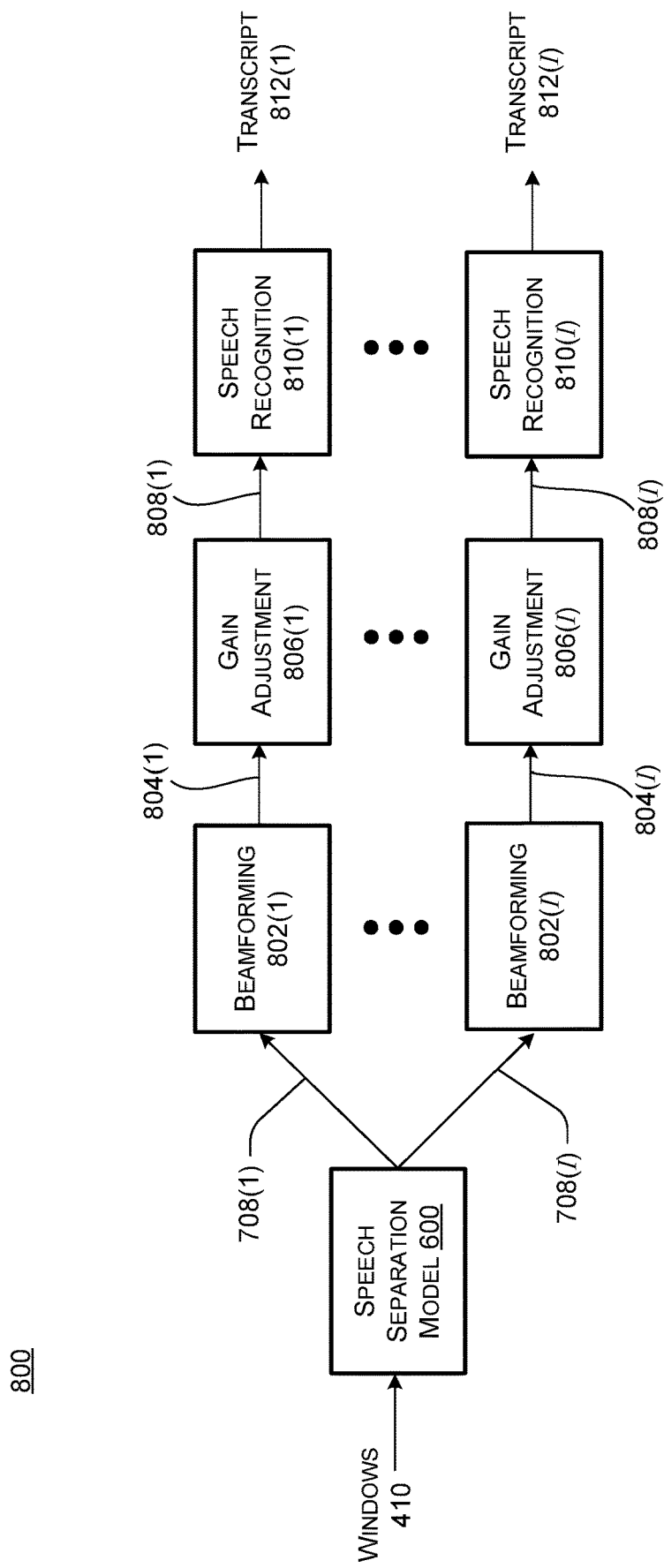

As noted above, one potential application of the speech separation techniques discussed herein is to provide speaker-specific transcripts for multi-party conversations. FIG. 8 shows a speech separation and transcription processing flow 800 that can be employed to obtain speaker-specific transcripts. Input data such as windows 410 can be input to a speech separation model 600, which can output user-specific mask streams 708(1) through 708(I). A beamforming process 802 can be applied using the user-specific mask streams to produce respective speaker-specific signals 804(1) through 804(I). The speaker-specific signals obtained with beamforming can then be applied to a gain-adjustment process 806 to obtain gain-adjusted speaker-specific signals 808(1) through 808(I). Gain-adjusted speaker-specific signals 808(I) through 808(I) can be input to a speech recognition system 810, which can generate transcripts 812(1) through 812(I). Note that, in implementations where there are fewer speakers than the number of speech separation model outputs I, there may be empty transcripts for unused speech separation model outputs.

In addition, the disclosed implementations are capable of speech separation independently of speech recognition. Thus, the respective gain-adjusted speaker-specific signals 808(1) through 808(I) can be used as separated speech without necessarily performing speech recognition. Also, note that various preprocessing steps can be performed on the input data prior to being input to the speech separation model, e.g., a dereverberation process can be applied to the original multi-microphone signal by applying a dereverberation filter prior to deriving the Fourier magnitude and phase coefficients.

Alternative Model Implementations

FIG. 6 illustrates one example of a speech separation model 600, e.g., a neural network implementation. Note, however, that other speech separation models may be employed, e.g., support vector machines, Bayesian classifiers using mixture models, or other machine learning models may be used in place of a neural network. Specifically, the disclosed implementations can include any speech separation model that processes input features from multiple microphones to obtain separate speaker-specific speech signals.

As noted above, speech separation models consistent with the disclosed implementations can process various types of input features, including magnitude and phase coefficients output by a transform such as a Fourier transform. As also noted, the phase coefficients may provide some information as to the relative locations of the speakers. Because the microphones pick up each individual speaker differently, e.g., based on their respective locations, the phase coefficients or information derived therefrom, such as the IPD features as discussed earlier, can improve the ability of a speech separation model to distinguish between different speakers.

As also noted, normalization of the input data can speed up convergence and/or aid accuracy of a speech separation model. Thus, the normalization techniques discussed elsewhere herein with respect to a neural network implementation may also be employed with other types of speech separation models, as mentioned above. Likewise, regardless of the type of speech separation model that is employed, the masks output by the speech separation model can be used to derive beamformers as discussed elsewhere herein, and the gain adjustment techniques discussed herein can be applied those beamformers.

In addition, other types of speech separation models may also process input data on a sliding window basis. In such implementations, the masks output for a given output channel in one window may not necessarily represent the same user for a subsequent window. Thus, the stitching implementations discussed herein can be employed for various different types of speech separation models.

Applications

The disclosed speech separation implementations can be employed to enable various applications. As already noted, for example, speech transcription can be performed on speaker-specific speech signals. This allows for transcriptions that not only identify which words are spoken during a given meeting or other event, but also enables the transcript to attribute specific spoken words to specific speakers even when multiple people speak over each other. Thus, outputting the speaker-specific speech signals (e.g., at block 314 of method 300) can include causing a speech transcription application to produce a transcription of a first speaker and a transcription of a second speaker, etc.

In addition, as previously noted, the speaker-specific speech signals are time-aligned. This enables transcriptions to accurately capture the order in which different speakers spoke specific words. In some implementations, a time-ordered transcript can be provided that identifies when two or more speakers speak concurrently, and identifies which speakers uttered which specific words. For example, consider the following brief time-aligned transcript sample:

Kat: We need evidence that your car . . . ok.

Joe: we are waiting for the estimate . . .

Here, one reading the transcript can easily see that Kat started speaking, Joe interrupted, and then Kat responded "ok." Specifically, one can see that Joe spoke the words "we are waiting for" as Kat spoke the words "evidence that your car . . . ," and so on. This type of transcript can be useful for understanding the interactions between two or more speakers in a given conversation.

As another example application of the speech separation implementations discussed herein, consider a digital assistant for a family. A real person could be in the same room as a television and request that the digital assistant perform different tasks. For example, Dana could say "How many new emails do I have?" while the television is showing a dialogue between various television characters. The speech separation techniques disclosed herein can parse these into separate speaker-specific signals, one for Dana and one for each of the television characters. In some cases, automated speaker recognition techniques can be applied to the separate speaker-specific signals to detect that Dana was the speaker of the question "How many new emails do I have?" Thus, the digital assistant can respond with an answer such as "Dana, you have four new emails." In this case, outputting the separate speaker-specific speech signals at block 314 of method 300 can include causing the digital assistant to take this action for Dana. In another case where a television character asks a similar question, the automated speaker recognition might not recognize the television character's voice from their separated speech signal. This can imply that the television character is not a designated user of the digital assistant and, as a consequence, the digital assistant can disregard the words spoken by the television character. On the other hand, if another recognized user of the digital assistant speaks an instruction to the digital assistant, the digital assistant can take an appropriate action on behalf of the other recognized user.

As another example application of the speech separation implementations discussed herein, consider a medical scenario where a hospital wishes to track interactions between patients and caregivers. Note that this may involve some privacy guarantees, e.g., anonymization of patient data, and/or notice requirements. Patients may speak comments about their symptoms, and the hospital may wish to ensure the caregivers ask appropriate follow-up questions to ensure a correct clinical diagnosis. This can be accomplished by using anonymized speaker-specific speech signals to determine what symptoms were described by the patient, and what questions were asked by the caregiver. Natural language processing techniques can be used to determine the words spoken by each individual.

The above examples are just a few of the potential applications of the multi-microphone speech separation technologies discussed herein.

Example System

Figure 9:
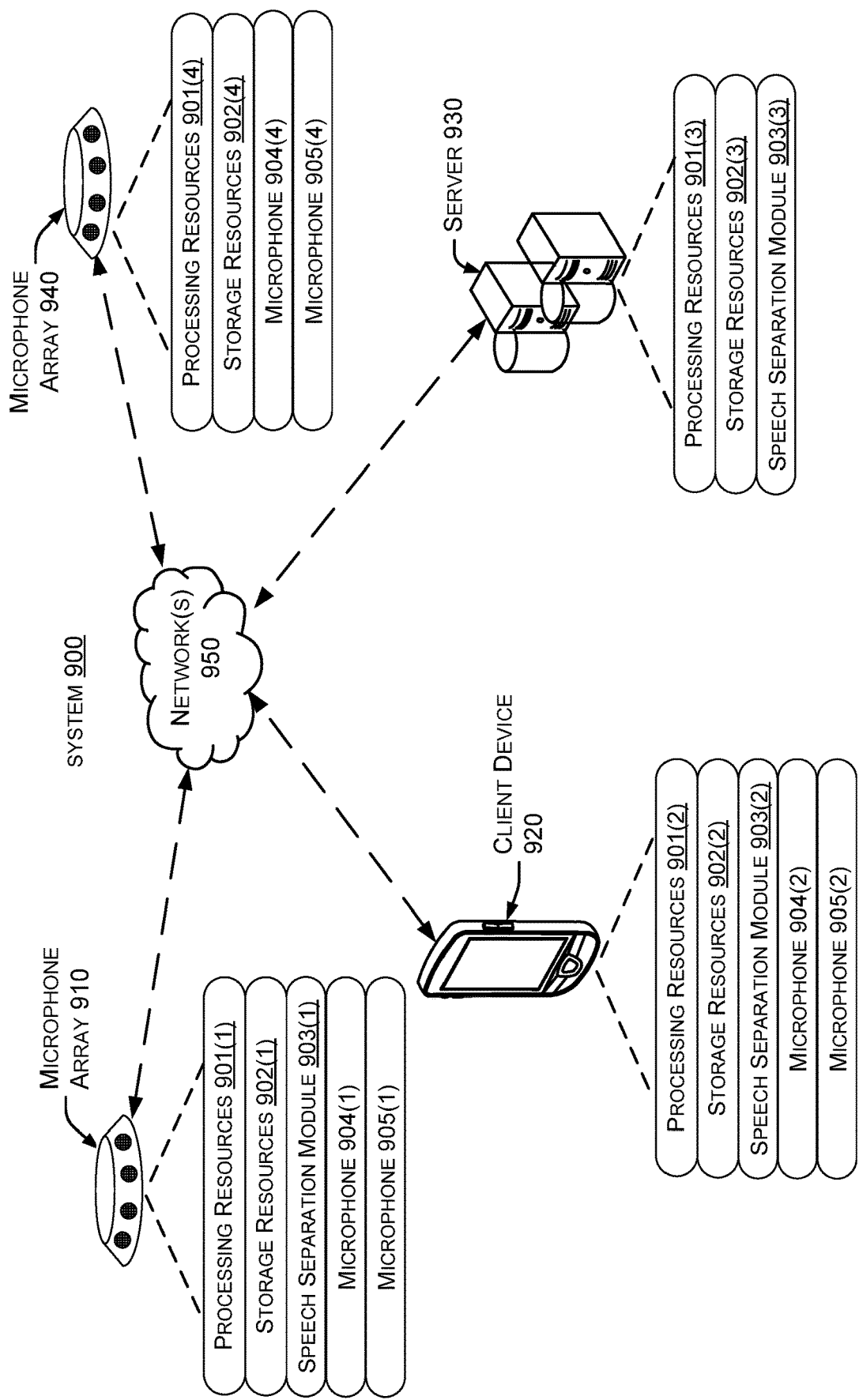
FIG. 9 illustrates an exemplary system, consistent with some implementations of the present concepts.

The present implementations can be performed in various scenarios on various devices. FIG. 9 shows an example system 900 in which the present implementations can be employed, as discussed more below.

As shown in FIG. 9, system 900 includes a microphone array 910, a client device 920, a server 930, and a microphone array 940, connected by one or more networks 950. Note that the client device can be embodied both as a mobile device as shown in FIG. 9, as well as stationary devices such as desktops, server devices, etc. Likewise, the server can be implemented using various types of computing devices. In some cases, any of the devices shown in FIG. 9, but particularly the server, can be implemented in data centers, server farms, etc.

Certain components of the devices shown in FIG. 9 may be referred to herein by parenthetical reference numbers. For the purposes of the following description, the parenthetical (1) indicates an occurrence of a given component on microphone array 910, (2) indicates an occurrence of a given component on client device 920, (3) indicates an occurrence on server 930, and (4) indicates an occurrence on microphone 940. Unless identifying a specific instance of a given component, this document will refer generally to the components without the parenthetical.

Generally, the devices 910, 920, 930, and/or 940 may have respective processing resources 901 and storage resources 902, which are discussed in more detail below. The devices may also have various modules that function using the processing and storage resources to perform the techniques discussed herein, as discussed more below. The storage resources can include both persistent storage resources, such as magnetic or solid-state drives, and volatile storage, such as one or more random-access memory devices. In some cases, the modules are provided as executable instructions that are stored on persistent storage devices, loaded into the random-access memory devices, and read from the random-access memory by the processing resources for execution.

Certain devices in FIG. 9 are shown with a speech separation module 903, which can perform any or all of the functionality discussed elsewhere herein. For example, the speech separation module can perform any or all of the blocks of method 300, as well as any or all of the functionality described herein. Microphone array 910, client device 920, and microphone array 940 can also have microphones 904 and 905, as well as other microphones not shown in FIG. 9. Note that, in some cases, microphones on different devices (e.g., two different client devices) can be used for the speech separation implementations discussed herein.

Also, note that speech separation processing can be distributed across individual devices of system 900 in any fashion. The following provides a few exemplary techniques for doing so. Microphone array 910 can be provided with relatively extensive processing and/or storage resources so that speech separation functionality can be performed directly on microphone 910. Microphone array 940 can be provided with relatively limited processing and/or storage resources, e.g., for recording audio streams and communicating the audio streams over network(s) 950 to any other device that has a speech separation module 903. Client device 920 can perform speech separation locally using speech separation module 903(2) and/or send audio signals from microphones 904 and/or 905 to server 930 for processing by speech separation module 903(3).

Various other implementations are contemplated. For example, in a conference room setting, one or more microphones could be integrated into a large display or whiteboard, possibly in addition to one or more external microphones. The display or whiteboard could perform speech separation locally or offload computation to a remote server, a local client device (e.g., using Bluetooth, Wi-Fi-direct, etc.). As another example, one or more microphone arrays and/or speech separation functionality could be provided on a home appliance, a vehicle, etc.

Device Implementations

As noted above with respect to FIG. 9, system 900 includes several devices, including a microphone array 910, a client device 920, a server 930, and a microphone array 940. As also noted, not all device implementations can be illustrated and other device implementations should be apparent to the skilled artisan from the description above and below.

The term "device", "computer," "computing device," "client device," and or "server device" as used herein can mean any type of device that has some amount of hardware processing capability and/or hardware storage/memory capability. Processing capability can be provided by one or more hardware processors (e.g., hardware processing units/cores) that can execute data in the form of computer-readable instructions to provide functionality. Computer-readable instructions and/or data can be stored on storage, such as storage/memory and or the datastore. The term "system" as used herein can refer to a single device, multiple devices, etc.

Storage resources can be internal or external to the respective devices with which they are associated. The storage resources can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

In some cases, the devices are configured with a general purpose hardware processor and storage resources. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term "processor," "hardware processor" or "hardware processing unit" as used herein can also refer to central processing units (CPUs), graphical processing units (GPUs), controllers, microcontrollers, processor cores, or other types of processing devices suitable for implementation both in conventional computing architectures as well as SOC designs.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In some configurations, any of the modules/code discussed herein can be implemented in software, hardware, and/or firmware. In any case, the modules/code can be provided during manufacture of the device or by an intermediary that prepares the device for sale to the end user. In other instances, the end user may install these modules/code later, such as by downloading executable code and installing the executable code on the corresponding device.

Also note that devices generally can have input and/or output functionality. For example, computing devices can have various input mechanisms such as keyboards, mice, touchpads, voice recognition, gesture recognition (e.g., using depth cameras such as stereoscopic or time-of-flight camera systems, infrared camera systems, RGB camera systems or using accelerometers/gyroscopes, facial recognition, etc.). Devices can also have various output mechanisms such as printers, monitors, etc.

Also note that the devices described herein can function in a stand-alone or cooperative manner to implement the described techniques. For example, the methods described herein can be performed on a single computing device and/or distributed across multiple computing devices that communicate over network(s) 950. Without limitation, network(s) 950 can include one or more local area networks (LANs), wide area networks (WANs), the Internet, and the like.

Additional Examples

Various device examples are described above. Additional examples are described below. One example includes a method performed on a computing device, the method comprising obtaining features reflecting mixed speech signals captured by multiple microphones, inputting the features to a neural network, obtaining masks output by the neural network, applying the masks to at least one of the mixed speech signals captured by at least one of the microphones to obtain two or more separate speaker-specific speech signals, and outputting the two or more separate speaker-specific speech signals.

Another example can include any of the above and/or below examples where the method further comprises applying the masks by multiplying the masks by a power spectrogram recorded by an individual microphone.

Another example can include any of the above and/or below examples where the method further comprises applying the masks by deriving beamformers from the masks and using the beamformers to obtain the two or more separate speaker-specific speech signals.

Another example can include any of the above and/or below examples where the method further comprises gain adjusting the two or more separate speaker-specific speech signals prior to the outputting.

Another example can include any of the above and/or below examples where the method further comprises training the neural network using permutation invariant training.

Another example can include any of the above and/or below examples where the features of the method comprise power spectra and phase features.

Another example can include any of the above and/or below examples where the method further comprises normalizing the features before inputting the features to the neural network.

Another example can include any of the above and/or below examples where the method further comprises inputting the features to the neural network as sliding windows, individual sliding windows comprising multiple audio segments, obtaining the masks from the neural network, the masks being output for respective sliding windows, and stitching masks for at least two adjacent sliding windows together.

Another example can include any of the above and/or below examples where the method further comprises processing the respective mixed speech signals to obtain the features, the features comprising plurality of frequency bins for individual segments of audio from each microphone, each frequency bin comprising magnitude and phase values of a Fourier transform.

Another example can include any of the above and/or below examples where the method further comprises combining the individual segments into the sliding windows, the sliding windows having respective overlapping portions.

Another example includes a system comprising a hardware processing unit and a storage resource storing computer-readable instructions which, when executed by the hardware processing unit, cause the hardware processing unit to obtain features reflecting multiple mixed speech signals captured by multiple microphones, normalize the features to obtain normalized features, input the normalized features to a speech separation model, obtain, from the speech separation model, respective masks for individual speakers, and apply the respective masks to at least one of the mixed speech signals to obtain at least two separate speaker-specific speech signals for different speakers.

Another example can include any of the above and/or below examples where the system further comprises the multiple microphones.

Another example can include any of the above and/or below examples where the multiple microphones are synchronized via a shared clock and the shared clock is a local hardware clock or a logical clock synchronized over a network.

Another example can include any of the above and/or below examples where the computer-readable instructions, when executed by the hardware processing unit, cause the hardware processing unit to perform automated speech recognition on the at least two separate speaker-specific signals to identify words spoken by the different speakers.

Another example can include any of the above and/or below examples where the computer-readable instructions, when executed by the hardware processing unit, cause the hardware processing unit to produce a transcript identifying first words spoken by a first speaker and second words spoken by a second speaker.

Another example can include any of the above and/or below examples where the computer-readable instructions, when executed by the hardware processing unit, cause the hardware processing unit to perform a first action in response to a first word spoken by a first speaker and perform a second action in response to a second word spoken by a second speaker.

Another example can include any of the above and/or below examples where the system features comprise power spectra and inter-microphone phase differences.

Another example can include any of the above and/or below examples where the computer-readable instructions, when executed by the hardware processing unit, cause the hardware processing unit to perform mean and variance normalization on the power spectra and perform mean normalization without variance normalization on the inter-microphone phase differences.

Another example includes a computer-readable storage medium storing instructions which, when executed by a processing device, cause the processing device to perform acts comprising obtaining speaker-specific masks from a speech separation model, the speech separation model producing the speaker-specific masks from input of at least two different microphones, using the speaker-specific masks to derive respective speaker-specific beamformed signals, performing gain adjustment on the respective speaker-specific beamformed signals to obtain gain-adjusted speaker-specific beamformed signals, and outputting the gain-adjusted speaker-specific beamformed signals.

Another example can include any of the above and/or below examples where the gain adjustment comprises modifying a gain of an individual speaker-specific beamformed signal of an individual speaker with a gain of a corresponding masked signal for the individual speaker.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

The invention claimed is:

1. A method performed on a computing device, the method comprising:
   obtaining features reflecting mixed speech signals captured by multiple microphones;
   inputting the features to a neural network;
   obtaining masks output by the neural network;
   applying the masks to at least one of the mixed speech signals captured by at least one of the microphones to obtain two or more separate speaker-specific speech signals;
   gain adjusting the two or more separate speaker-specific speech signals; and
   outputting the two or more separate speaker-specific speech signals after the gain adjusting.

2. The method of claim 1, further comprising:
   applying the masks by deriving beamformers from the masks and using the beamformers to obtain the two or more separate speaker-specific speech signals.

3. The method of claim 1, further comprising:
   training the neural network using permutation invariant training.

4. The method of claim 1, the features comprising power spectra and phase features.

5. The method of claim 1, further comprising:
   normalizing the features before inputting the features to the neural network.

6. The method of claim 1, further comprising:
   inputting the features to the neural network as sliding windows, individual sliding windows comprising multiple audio segments;
   obtaining the masks from the neural network, the masks being output for respective sliding windows; and
   stitching masks for at least two adjacent sliding windows together.

7. The method of claim 6, further comprising:
   processing the respective mixed speech signals to obtain the features, the features comprising plurality of frequency bins for individual segments of audio from each microphone, each frequency bin comprising magnitude and phase values of a Fourier transform.

8. The method of claim 7, further comprising:
   combining the individual segments into the sliding windows, the sliding windows having respective overlapping portions.

9. A system comprising:
   a hardware processing unit; and
   a storage resource storing computer-readable instructions which, when executed by the hardware processing unit, cause the hardware processing unit to:
   obtain features reflecting multiple mixed speech signals captured by multiple microphones;
   normalize the features to obtain normalized features;
   input the normalized features to a speech separation model;
   obtain, from the speech separation model, respective masks for individual speakers; and
   apply the respective masks to at least one of the mixed speech signals to obtain at least two separate speaker-specific speech signals for different speakers.

10. The system of claim 9, further comprising the multiple microphones.

11. The system of claim 10, the multiple microphones being synchronized via a shared clock, wherein the shared clock is a local hardware clock or a logical clock synchronized over a network.

12. The system of claim 9, wherein the computer-readable instructions, when executed by the hardware processing unit, cause the hardware processing unit to:
   perform automated speech recognition on the at least two separate speaker-specific speech signals to identify words spoken by the different speakers.

13. The system of claim 12, wherein the computer-readable instructions, when executed by the hardware processing unit, cause the hardware processing unit to:
   produce a transcript identifying first words spoken by a first speaker and second words spoken by a second speaker.

14. The system of claim 12, wherein the computer-readable instructions, when executed by the hardware processing unit, cause the hardware processing unit to:
perform a first action in response to a first word spoken by a first speaker; and
perform a second action in response to a second word spoken by a second speaker.

15. The system of claim 9, the features comprising power spectra and inter-microphone phase differences.

16. The system of claim 15, wherein the computer-readable instructions, when executed by the hardware processing unit, cause the hardware processing unit to:
perform mean and variance normalization on the power spectra; and
perform mean normalization without variance normalization on the inter-microphone phase differences.

17. A method comprising:
obtaining features reflecting multiple mixed speech signals captured by multiple microphones;
normalizing the features to obtain normalized features;
inputting the normalized features to a speech separation model;
obtaining, from the speech separation model, respective masks for individual speakers; and
applying the respective masks to at least one of the mixed speech signals to obtain at least two separate speaker-specific speech signals for different speakers.

18. The method of claim 17, performed in the absence of data indicating a number of speakers present in the multiple mixed speech signals.

19. The method of claim 18, performed multiple times as the number of speakers present in the multiple mixed speech signals changes over time.

20. The method of claim 17, further comprising:
performing a dereverberation process on the multiple mixed speech signals prior to inputting the normalized features to the speech separation model.

21. The method of claim 20, wherein the dereverberation process comprises applying a dereverberation filter to the multiple mixed speech signals prior to obtaining the features.

* * * * *